(12) United States Patent
Thomas

(10) Patent No.: US 11,488,235 B2
(45) Date of Patent: Nov. 1, 2022

(54) SYSTEMS, METHODS, AND DEVICES FOR UTILIZING WEARABLE TECHNOLOGY TO FACILITATE FULFILLING CUSTOMER ORDERS

(71) Applicant: Oculogx Inc., Bentonville, AR (US)

(72) Inventor: Charu Thomas, Cumming, GA (US)

(73) Assignee: Oculogx Inc., Bentonville, AR (US)

( * ) Notice: Subject to any disclaimer, the term of this patent is extended or adjusted under 35 U.S.C. 154(b) by 434 days.

(21) Appl. No.: 16/595,262

(22) Filed: Oct. 7, 2019

(65) Prior Publication Data
US 2021/0103974 A1    Apr. 8, 2021

(51) Int. Cl.
*G06Q 30/00* (2012.01)
*G06Q 30/06* (2012.01)
(Continued)

(52) U.S. Cl.
CPC ....... *G06Q 30/0635* (2013.01); *G02B 27/017* (2013.01); *G06F 3/011* (2013.01);
(Continued)

(58) Field of Classification Search
USPC ....................................... 705/26.81
See application file for complete search history.

(56) References Cited

U.S. PATENT DOCUMENTS 7,243,001 B2 *   7/2007   Janert .................... G06Q 10/08
                                                              700/213
8,103,377 B1 *   1/2012   Wong .................... G06Q 10/087
                                                              700/216
(Continued)

FOREIGN PATENT DOCUMENTS

AU       2012219825 B2    9/2013
CN       102281348 A      12/2011
(Continued)

OTHER PUBLICATIONS

Stoltz, M., Giannikas, V., McFarlane, D., Strachan, J., Um, J., Srinivasan, R., Augmented Reality in Warehouse Operations: Opportunities and Barriers, Jul. 2017, IFAC-PapersOnLine, vol. 50, Issue 1, p. 12979-12984. (Year: 2017).*

(Continued)

*Primary Examiner* — Jeffrey A. Smith
*Assistant Examiner* — Brittany E Bargeon
(74) *Attorney, Agent, or Firm* — Lee Sullivan Shea & Smith LLP

(57) ABSTRACT

Examples include a HUD that (i) identifies a fulfillment route comprising item entries, each comprising an item identifier and item location corresponding to a location within a given environment, (ii) presents a visualization corresponding to a first item entry that includes an indication of a first item location, (iii) based on a first sound and/or visual input, verifies that there is an instance of a first item identified in the first item entry, (iv) based on the verification, presents a placement visualization representing item receptacles in the given environment and a placement indication identifying a target item receptacle that is to receive the first item, (v) based on a second sound and/or visual input, determines that the target item receptacle received the first item, and (vi) based on the determination, presents a second visualization corresponding to a second item entry that includes an indication of a second item location.

17 Claims, 10 Drawing Sheets

(51) Int. Cl.
*G06Q 10/08* (2012.01)
*G06F 3/01* (2006.01)
*G06F 3/048* (2013.01)
*G02B 27/01* (2006.01)

(52) U.S. Cl.
CPC ........... *G06F 3/048* (2013.01); *G06Q 10/087* (2013.01); *G06Q 30/0643* (2013.01)

(56) References Cited

U.S. PATENT DOCUMENTS

| | | | | |
|---|---|---|---|---|
| 8,682,473 | B1* | 3/2014 | Ramey | G06Q 10/087 700/216 |
| 9,020,631 | B1* | 4/2015 | Bellavance | G06Q 50/28 700/216 |
| 9,505,554 | B1* | 11/2016 | Kong | G06T 7/254 |
| 9,798,983 | B2 | 10/2017 | Thompson et al. | |
| 10,055,645 | B1* | 8/2018 | Madan | G06V 20/20 |
| 10,163,149 | B1* | 12/2018 | Famularo | G06Q 10/08 |
| 10,242,333 | B1* | 3/2019 | Colucci, III | G06Q 10/083 |
| 10,282,696 | B1* | 5/2019 | Bettis | G06Q 10/087 |
| 10,438,259 | B1* | 10/2019 | Boyapati | G06Q 30/0623 |
| 10,449,889 | B2 | 10/2019 | Letson et al. | |
| 10,457,393 | B2 | 10/2019 | Thompson et al. | |
| 10,592,962 | B1* | 3/2020 | Lauka | G06K 19/06037 |
| 10,625,899 | B2 | 4/2020 | Atchley et al. | |
| 10,627,984 | B2 | 4/2020 | Thompson et al. | |
| 10,807,714 | B2 | 10/2020 | Atchley et al. | |
| 10,896,584 | B2 | 1/2021 | Letson et al. | |
| 11,120,378 | B1* | 9/2021 | Willard, III | G06Q 10/06316 |
| 2006/0206235 | A1* | 9/2006 | Shakes | B65G 1/1373 700/216 |
| 2013/0234914 | A1 | 9/2013 | Fujimaki | |
| 2014/0257883 | A1 | 9/2014 | Thompson et al. | |
| 2016/0092974 | A1* | 3/2016 | Keller | G05B 19/12 700/216 |
| 2017/0124484 | A1 | 5/2017 | Thompson et al. | |
| 2017/0158431 | A1* | 6/2017 | Hamilton | G05B 19/41895 |
| 2017/0186073 | A1 | 6/2017 | Bryan et al. | |
| 2017/0221019 | A1 | 8/2017 | Letson et al. | |
| 2017/0236090 | A1 | 8/2017 | Bryan et al. | |
| 2017/0249073 | A1 | 8/2017 | Thompson et al. | |
| 2017/0283057 | A1 | 10/2017 | Thompson et al. | |
| 2018/0165626 | A1* | 6/2018 | Davidson | G06Q 10/08 |
| 2018/0281954 | A1 | 10/2018 | Atchley et al. | |
| 2018/0282014 | A1 | 10/2018 | Atchley et al. | |
| 2018/0305123 | A1* | 10/2018 | Lert, Jr | G06K 9/00335 |
| 2018/0322523 | A1 | 11/2018 | Letson et al. | |
| 2019/0057341 | A1* | 2/2019 | Salter | G05D 1/0088 |
| 2019/0104830 | A1 | 4/2019 | Cortellacci et al. | |
| 2019/0107411 | A1* | 4/2019 | Gil | G01C 21/3632 |
| 2019/0160994 | A1 | 5/2019 | Letson et al. | |
| 2019/0311322 | A1* | 10/2019 | DeJarnette | H04W 4/021 |
| 2019/0313831 | A1 | 10/2019 | Bryan et al. | |
| 2019/0315551 | A1 | 10/2019 | Bryan et al. | |
| 2020/0008003 | A1 | 1/2020 | Thompson et al. | |
| 2020/0010008 | A1 | 1/2020 | Letson et al. | |
| 2020/0039747 | A1* | 2/2020 | Ahmann | B25J 5/007 |
| 2020/0172334 | A1* | 6/2020 | Yamashita | B65G 1/1376 |
| 2020/0231385 | A1* | 7/2020 | Lisso | B65G 1/1378 |
| 2020/0272970 | A1* | 8/2020 | Willard, III | B65G 1/1371 |
| 2020/0349815 | A1 | 11/2020 | Letson et al. | |
| 2021/0039886 | A1* | 2/2021 | Lisso | B65G 1/1375 |
| 2021/0097821 | A1 | 4/2021 | Letson et al. | |
| 2021/0166179 | A1* | 6/2021 | Pande | G06Q 30/0202 |
| 2021/0269244 | A1* | 9/2021 | Ahmann | G05B 19/042 |

FOREIGN PATENT DOCUMENTS

| | | |
|---|---|---|
| EP | 2161219 B1 | 3/2010 |
| JP | 2013245029 A | 12/2013 |
| JP | 5901427 B2 | 4/2016 |
| KR | 101282292 B1 | 7/2013 |
| KR | 101533360 B1 | 7/2015 |
| WO | 2014028959 A1 | 2/2014 |
| WO | 2017064329 A1 | 4/2017 |
| WO | 2017071733 A1 | 5/2017 |
| WO | 2017148532 A1 | 9/2017 |

OTHER PUBLICATIONS

Kim et al. "Influences of augmented reality head-worn display type and user interface design on performance and usability in simulated warehouse order picking." Applied Ergonomics 74 (2019) pp. 186-193.

Weaver et al. "An empirical task analysis of warehouse order picking using head-mounted displays." CHI 2010: Interactions in the World Apr. 10-15, 2010, Atlanta, GA, Jan. 2010, 11 pages.

Baumann, Hannes. "Order Picking Supported by Mobile Computing." Thesis Submission to University of Bremen, Jan. 2013, 214 pages.

* cited by examiner

SYSTEMS, METHODS, AND DEVICES FOR UTILIZING WEARABLE TECHNOLOGY TO FACILITATE FULFILLING CUSTOMER ORDERS

BACKGROUND

Online shopping has become a mainstay in everyday life. It is expected that 70% of U.S. consumers will regularly purchase goods online. From the perspective of a customer, the customer simply submits an order through the Internet, and after some amount of time passes, a package arrives at the customer's front door or the customer picks up the order at a brick-and-mortar store or the like. However, the intervening step of this apparently simple process—namely, personnel at a warehouse, retail establishment, etc. retrieving and assembling the goods for the order—accounts for a significant amount of time and resources spent by fulfillment establishments. Indeed, the fulfillment process (also referred to as "order picking") accounts for over 50% of the annual costs spent on warehouse operations in the U.S. Many traditional distribution centers still use decades-old techniques to perform this process, and many retail fulfillment establishments are unable to adopt traditional distribution center innovations to improve similar operational tasks in-store.

SUMMARY

Various embodiments of the present technology involve a method comprising a heads-up display (HUD) device (i) identifying a fulfillment route comprising a plurality of item entries, wherein each respective item entry comprises (a) an item identifier and (b) an item location corresponding to a location within a given environment, (ii) presenting, via a display, a first visualization corresponding to a first item entry from the fulfillment route, wherein the first visualization comprises a visual indication of a first item location, (iii) based on at least one of a first sound input or a first visual input received by the HUD device, making a verification that there is an instance of a first item identified in the first item entry, (iv) based on the verification, presenting, via the display, (a) a placement visualization representing an array of a plurality of item receptacles in the given environment and (b) at least one placement indication within the placement visualization identifying at least one target item receptacle of the plurality of item receptacles that is to receive the first item, (v) based on at least one of a second sound input or a second visual input received by the HUD device, making a determination that the at least one target item receptacle received at least one instance of the first item, and (vi) based on the determination, presenting, via the display, a second visualization corresponding to a second item entry from the fulfillment route, wherein the second visualization comprises a visual indication of a second item location.

In example embodiments, the fulfillment route comprises a sequence order for the plurality of item entries that was defined in accordance with the locations within the given environment that correspond to the plurality of item entries.

In example embodiments, the method further involves the HUD device making an out-of-stock determination that an instance of a second item identified in the second item entry is lacking at the second item location and based on the out-of-stock determination, identifying at least one alternative item location for the second item within the given environment.

In example embodiments, making the out-of-stock determination involves the HUD device receiving, via an input interface of the HUD, an input that is indicative of an out-of-stock occurrence and making the out-of-stock determination based on the input that is indicative of the out-of-stock occurrence.

In example embodiments, the second visual indication further comprises a visual indication of a second item identified in the second item entry, and the method further involves the HUD device, based on the out-of-stock determination, identifying an updated fulfillment route comprising an item entry that comprises the at least one alternative item location within the environment, and in accordance with the updated fulfillment route, presenting, via the display, a third visual indication of the at least one alternative item location for the second item.

In example embodiments, the first item entry comprises a first item identifier and making the verification that there is an instance of the first item identified in the first item entry involves the HUD device executing an object-detection model corresponding to the first item identifier utilizing the first visual input received by the HUD and making the verification that there is an instance of the first item identified in the first item entry based on the execution of the object detection model.

In example embodiments, the object-detection model is a first object-detection model and making the determination that the at least one target item receptacle received at least one instance of the first item involves the HUD device executing the first object-detection model utilizing the second visual input to make a determination that an instance of the first item is within the second visual input, executing a second object-detection model utilizing the second visual input to make a determination that the at least one target item receptacle is within the second visual input, and based on the determination that an instance of the first item is within the second visual input and the determination that the at least one target item receptacle is within the second visual input, making the determination that the at least one target item receptacle received at least one instance of the first item.

Moreover, various embodiments of the present technology involve a HUD device comprising at least one network interface configured to communicatively couple the HUD device to at least one data network, a display configured to present one or more visualizations, at least one processor, a non-transitory computer-readable medium, and program instructions stored on the non-transitory computer-readable medium that are executable by the at least one processor such that the HUD device is configured to carry out the aforementioned method functions.

Further yet, various embodiments of the present technology involve a non-transitory computer-readable medium comprising program instructions stored thereon that are executable by at least one processor such that a wearable computing device is configured to carry out the aforementioned method functions.

One of ordinary skill in the art will appreciate these as well as numerous other embodiments in reading the following disclosure.

DETAILED DESCRIPTION

Figure 1:
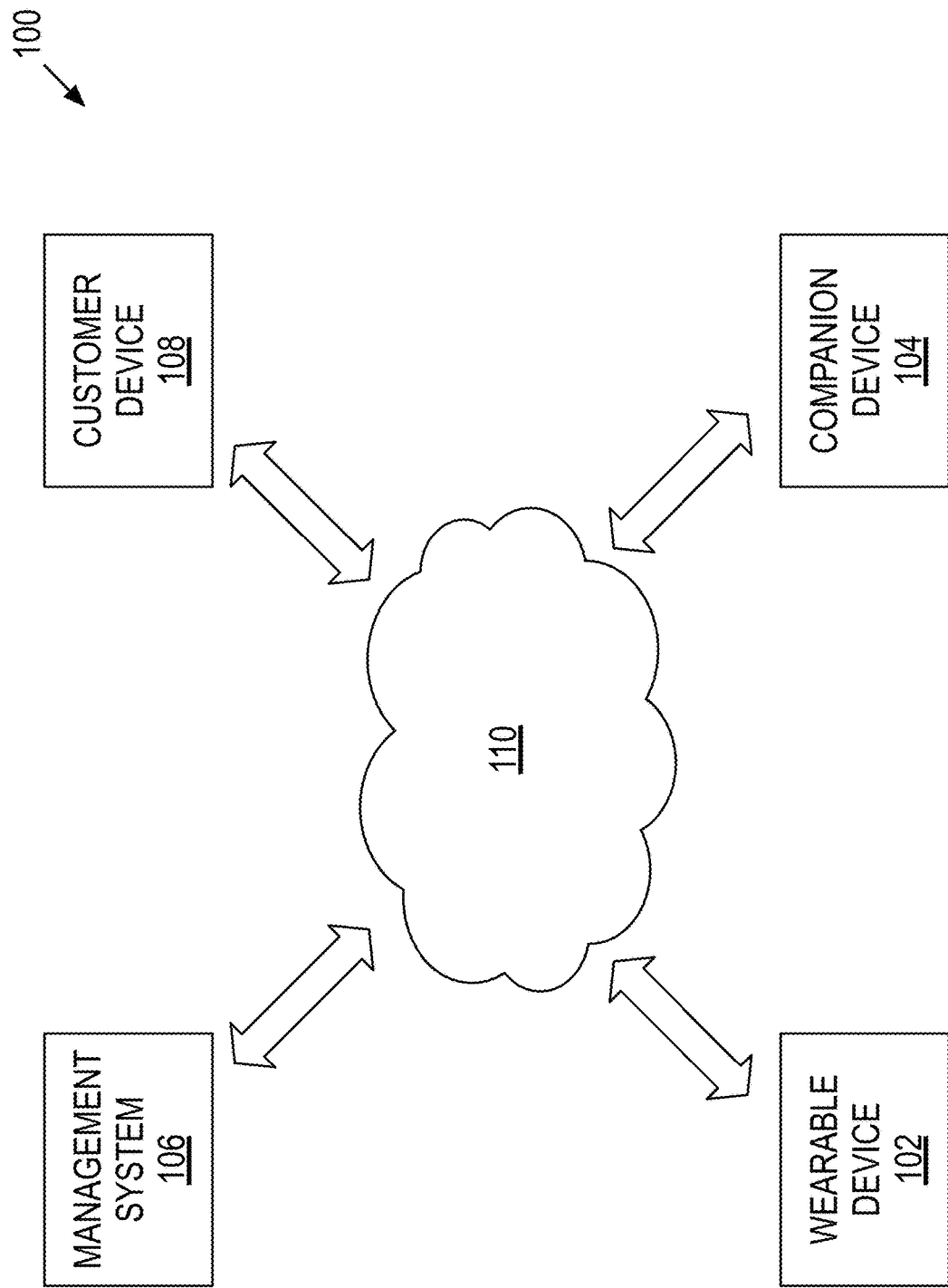
FIG. 1 depicts an example network configuration in which example embodiments may be implemented.

The following disclosure makes reference to the accompanying figures and several example embodiments. One of ordinary skill in the art should understand that such references are for the purpose of explanation only and are therefore not meant to be limiting. Aspects of the disclosed embodiments may be rearranged, combined, added to, and/or removed in a variety of manners, each of which is contemplated herein.

I. Brief Introduction

Most people are familiar with online shopping. A customer (i) creates an order that includes one or more items using a client device (e.g., a laptop, smartphone, tablet, etc.), (ii) submits the order using the client device via the Internet, and (iii) once the order has been fulfilled, either receives a delivery comprising the ordered items or picks up the ordered items from a brick-and-mortar store or the like.

Commonly, personnel (sometimes referred to as "pickers") working at a warehouse or other distribution center fulfill customer orders by hand retrieving the items in a given customer order. Traditionally, a picker walks around the warehouse with a piece of paper having a list of items in a given customer order and "checks off" items from that list as the picker retrieves those items from various locations in the warehouse. Other than the picker's own attentiveness, there is no other mechanism to verify that the picker obtained the correct items and correct quantity of each item from the list. Some more advanced "picking" techniques involve equipping a picker with a simple barcode scanner that the picker uses to scan a respective barcode associated with each unique item from the list as that unique item is retrieved. While this technique helps to improve the accuracy of the basic pencil-and-paper picking technique, the barcode-scanning technique typically increases the total amount of time it takes to fulfill an order and is still prone to human-picker errors.

To help solve the deficiencies in these picking techniques, some innovations have been developed that utilize robots to replace human pickers and thereby avoid the human-pickers' errors and inefficiencies. However, robotic picking systems are typically cost prohibitive for many fulfillment establishments to implement, operate, and maintain. Moreover, such systems generally require significant infrastructure changes to existing fulfillment establishments and require large spaces for the robots to operate within. Many existing fulfillment establishments, such as consumer retail stores and food establishments, physically cannot accommodate robotic picking systems.

Example embodiments provided herein seek to help address the deficiencies in existing order-fulfillment technology. To this end, in one aspect, an order fulfillment system is provided that leverages wearable technology (e.g., heads-up display (HUD) technology) that provides a technological advancement over existing order-fulfillment technology. Such an order fulfillment system provides advanced functionality not previously needed or otherwise performed when human pickers utilized the above-discussed picking techniques and provides a technological alternative to robotic picking systems.

II. Example Network Configuration

Turning now to FIG. 1, an example network configuration 100 in which aspects of example embodiments may be implemented is depicted. As shown, network configuration 100 includes one or more wearable computing devices 102, one or more corresponding companion devices 104, one or more management computing systems 106, and one or more customer computing devices 108, all of which may be communicatively coupled through one or more data networks 110. In example implementations, some aspects of network configuration 100 may be located within a given fulfillment establishment, such as a warehouse, other distribution center, retail store, food establishment, etc. For instance, one or more wearable computing devices 102 and corresponding companion devices 104 may be located within a given fulfillment establishment, and management computing system 106 may also be wholly or partially located within the given fulfillment establishment or wholly or partially located remotely, such as at a remote server farm or the like. Other example arrangements are also possible.

In practice, a picker may wear one or more wearable computing devices 102 to help facilitate the picker's order fulfillment tasks. In general, wearable computing device 102 is designed such that a picker can operate wearable computing device 102 and utilize wearable computing device 102's functionality with limited user interaction. In this regard, at least some wearable computing devices 102 may permit "hands-free" operation in that a picker can perform various manual tasks with both hands while also leveraging the functionality of wearable computing device 102. Various types of wearable computing devices 102 may be utilized that augment a human-picker's abilities, such as a HUD device (sometimes referred to as a "head-mountable/mounted device" (HMD)). One example HUD device is described in further detail below with reference to FIG. 2.

In some example embodiments, a picker equipped with wearable computing device 102 may also utilize one or more corresponding companion devices 104 that may be in communication with wearable computing device 102. In general, companion device 104 is configured to facilitate, supplement, and/or augment the functionalities of its corresponding wearable computing device 102. Various types of companion devices 104 are possible.

As one example, companion device 104 may take the form of a portable client device (e.g., a smartphone, tablet, etc.) with a software application stored thereon that is configured to control various aspects of wearable computing device 102 (e.g., via a Bluetooth connection between the two devices). In this example, the portable client device may also include additional and/or more advanced components that allow functions to be offloaded from wearable computing device 102. For instance, the portable client device may include additional and/or more advanced processing components, memory components, object-detection components, and/or speech-processing components compared to wearable computing device 102. Moreover, the portable client device may also be configured to communicate with management computing system 106 (e.g., via a wireless network interface or the like), perhaps on behalf of wearable computing device 102. Additional aspects of a portable client device are discussed below.

As another example, companion device 104 may take the form of a companion wearable computing device, such as a wearable radio frequency identification (RFID) detection device. Such a companion device may be configured to exchange information with wearable computing device 102 (or another companion device, such as a portable client device) after the companion device detects an RFID tag or the like that may be associated with a given item or bin of items. In one particular example, an RFID detection device may be designed in a manner such that it can be worn around a picker's wrist and configured to communicate with wearable computing device 102 directly or indirectly through a companion portable client device via one or more short-range communication paths (e.g., one or more Bluetooth communication paths). Other examples are also possible.

As yet another example, companion device 104 may take the form of a barcode scanner. The barcode scanner may be configured to scan an item's barcode or the like and then exchange information associated with that scan to wearable computing device 102 (e.g., via a Bluetooth connection between the two devices). In some implementations, wearable computing device 102 may itself be equipped with barcode scanning capabilities.

Other example types of companion devices 104 are possible. In example embodiments, multiple, different types of companion devices 104 may be communicatively coupled to a given wearable computing device 102. While in other embodiments, a given wearable computing device 102 may not be communicatively coupled to any companion device 104.

Broadly speaking, management computing system 106 may include one or more computing systems configured to facilitate monitoring, managing, and/or facilitating fulfillment of customer orders. To those ends, management computing system 106 may comprise one or more computing systems provisioned with software for performing one or more management system functions described herein, including but not limited to receiving customer orders from customer computing devices 108, generating, identifying, and/or updating fulfillment routes, identifying substitute items, providing information to wearable computing devices 102 and/or companion devices 104, and receiving information from wearable computing devices 102 and/or companion devices 104, among various other functions.

Management computing system 106 may take a variety of forms and be arranged in a variety of manners. As one possibility, management computing system 106 may include computing infrastructure that is wholly or partially located local to a given fulfillment establishment and may communicate with wearable computing devices 102 and/or companion devices 104 via one or more local area networks (LANs) 110 or the like and with customer computing devices 108 via one or more wide area networks (WANs) 110 or the like. As another possibility, management computing system 106 may include computing infrastructure that is wholly or partially located remote from a given fulfillment establishment (e.g., such a management computing system may be "cloud" based) and may communicate with wearable computing devices 102, companion devices 104, and/or customer computing devices 108 via one or more WANs 110 or the like. Other arrangements are also possible. Although not shown in FIG. 1, management computing system 106 may be communicatively coupled to various third-party computing systems that provide services that facilitate order fulfillments, such as third-party systems that generate fulfillment routes, third-party systems that perform object detection, and/or third-party systems that perform speech processing operations, among other possibilities.

From a structural perspective, management computing system 106 may include one or more computing devices (e.g., one or more servers) that collectively comprise at least one processor, data storage, and at least one communication interface, each of which are communicatively linked by a communication bus or another type of connection mechanism. The at least one processor may comprise one or more processor components, which may take the form of general-purpose processors (e.g., microprocessors), special-purpose processors (e.g., application-specific integrated circuits, field-programmable integrated circuits, DSPs, GPUs, etc.), and/or controllers (e.g., microcontrollers), among other possibilities. The data storage may comprise one or more non-transitory, computer-readable mediums, which may take the form of volatile or non-volatile storage mediums, such as random-access memory, caches, buffers, read-only memory, flash memory, solid-state drives, or hard-disk drives, among other possibilities. The data storage may comprise software that generally is in the form of program instructions that are executable by the at least one processor such that management computing system 106 is capable of performing the management functions disclosed herein. The at least one communication interface may be configured to facilitate wired and/or wireless data communications with various data sources and data recipients, such as wearable computing devices 102, companion devices 104, customer computing devices 108, and/or other computing systems (not depicted). Examples of the at least one communication interface may include an Ethernet interface, a serial bus interface, or a chipset and antenna configured for wireless communication (e.g., a Wi-Fi interface), among other possibilities.

In some cases, management computing system 106 may be configured to determine optimized fulfillment routes for customer orders at a given fulfillment establishment and thus, may comprise software and/or hardware that facilitates solving shortest-path and/or traveling-salesperson problems. Moreover, management computing system 106 may be configured to facilitate object-detection functionality and thus, may comprise software and/or hardware that facilitates training object-detection models, executing object-detection models based on visual data from wearable computing devices 102, and/or deploying object-detection models to wearable computing devices 102. Further yet, management computing system 106 may be configured to facilitate speech-recognition functionality and thus, may comprise software and/or hardware that facilitates speech detection, natural language processing, and the like based on sound data captured by wearable computing devices 102 and/or companion devices 104. Management computing system 106 may be configured to perform various other functions as well, some of which are discussed below.

As mentioned before, customer computing devices 108 may generally be used by customers to submit online orders for goods. To that end, customer computing devices 108 may be configured with software and/or hardware to facilitate customer computing devices 108 communicating customer orders to management computing system 106. For instance, customer computing devices 108 may include at least one processor, data storage, one or more communication interfaces (e.g., one or more wireless and/or wired network interfaces), and one or more input interfaces (e.g., mouse and keyboard, touchscreen, etc.) that are configured to receive user inputs related to assembling and submitting customer orders. Customer computing devices 108 may take various forms, such as different types of client devices (e.g., a desktop computer, laptop, smartphone, tablet, etc.), among other examples.

In practice, customer computing devices 108 may typically communicate with management computing system 106 via one or more WANs 110. In some instances, one or more customer computing devices 108 may be located at a given fulfillment establishment along with wearable computing devices 102 and/or management computing system 106 and/or may be communicatively coupled to a LAN that wearable computing devices 102 and/or management computing system 106 are also coupled to. Other possibilities also exist.

As suggested before, data network 110 may include one or more data networks that facilitate communications between the various components depicted and/or described with reference to FIG. 1. The one or more data networks may be wired, wireless, or some combination thereof and may facilitate communications according to any of a variety of different communication protocols. Some particular examples of the one or more data networks may include one or more WANs (e.g., the Internet, cellular networks, etc.), LANs, personal area networks (PANs), and/or short-range links, among other possibilities.

II. Example Wearable Computing Device

Figure 2:
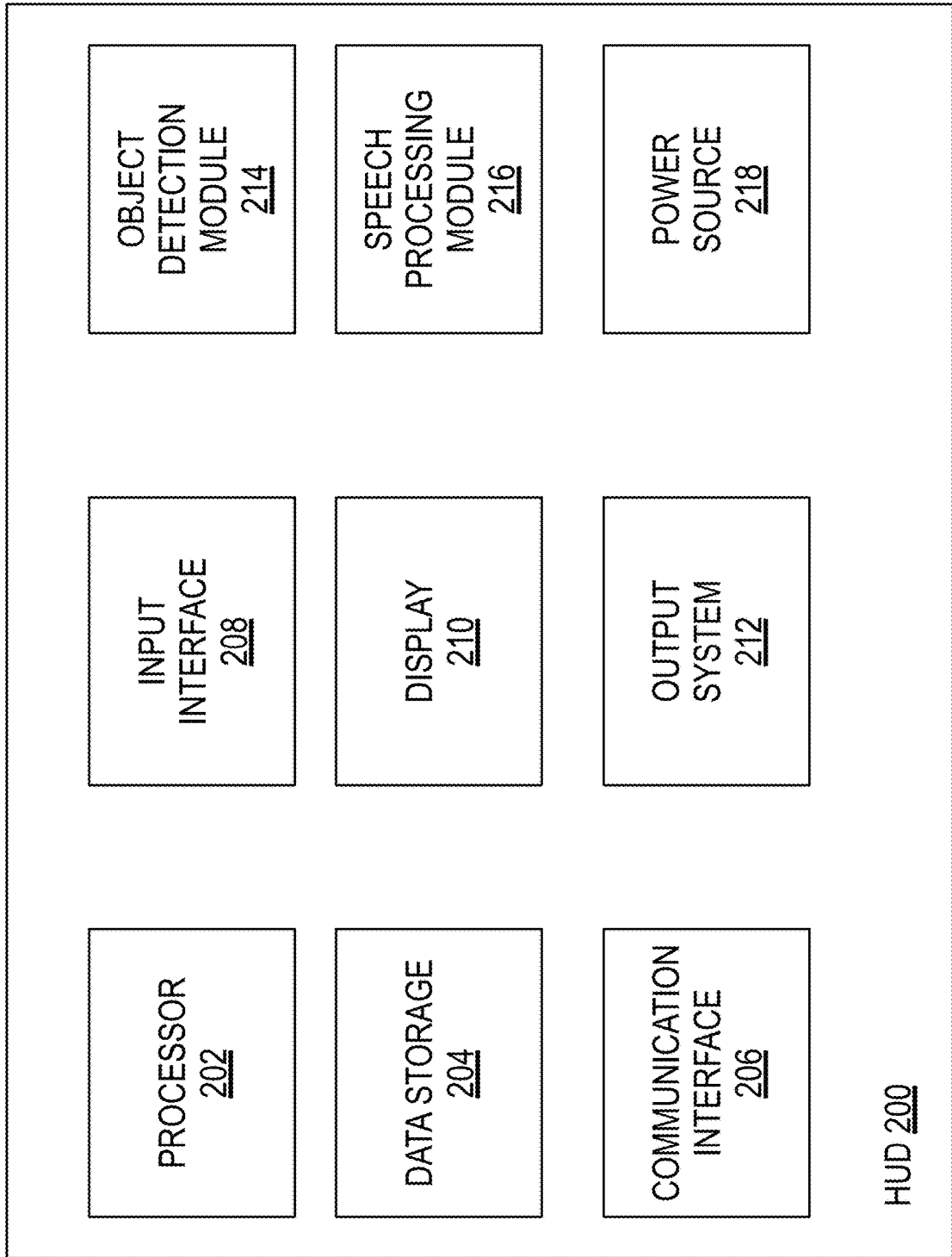
FIG. 2 depicts a simplified block diagram of an example wearable computing device in the form of an example heads-up display (HUD) device.

FIG. 2 depicts a simplified block diagram of an example wearable computing device in the form of an example HUD device 200. Although not depicted, HUD device 200 includes a framing structure that is designed to secure HUD device 200 to a wearer's head, such as an eyeglasses, goggles, or helmet structure, among other possibilities. HUD device 200's framing structure may house or otherwise comprise at least one processor 202, data storage 204, at least one communication interface 206, at least one input interface 208, at least one display 210, at least one output system 212, at least one object-detection module 214, and at least one speech-processing module 216, some or all of which are communicatively linked by a communication bus or another type of connection mechanism. HUD device 200 also includes at least one power source 218 that provides power to a variety of HUD device 200's other components, such as a rechargeable lithium-ion battery or the like.

Processor 202 may comprise one or more processor components that may take the form of general-purpose processors (e.g., microprocessors), special-purpose processors (e.g., application-specific integrated circuits, field-programmable integrated circuits, DSPs, GPUs, etc.), and/or controllers (e.g., microcontrollers), among other possibilities. Data storage 204 may comprise one or more non-transitory, computer-readable mediums that may take the form of volatile or non-volatile storage mediums (e.g., random-access memory, caches, buffers, read-only memory, flash memory, or solid-state drives), among other possibilities. Data storage 204 may comprise software that generally is in the form of program instructions that are executable by processor 202 such that HUD device 200 is capable of performing HUD device functions disclosed herein.

Communication interface 206 may be configured to facilitate wired and/or wireless data communications with various data sources and data recipients, such as other wearable computing devices 102, companion devices 104, management computing system 106, and/or other computing systems not depicted in FIG. 1. In example embodiments, communication interface 206 may include one or more communication interfaces that each take the form of a chipset and antenna configured for wireless communication, among other possibilities. In certain implementations, communication interface 206 may include at least one wireless communication interface configured according to a first communication protocol (e.g., according to one or more Wi-Fi communication protocols) and a second wireless communication interface configured according to a second communication protocol (e.g., according to one or more Bluetooth communication protocols). Other communication interfaces are possible as well.

Input interface 208 may include one or more input interfaces that are generally configured to receive, detect, and/or otherwise capture a stimulus originating external to HUD device 200 and then output information indicative of such stimulus to other components of HUD device 200. One or more of input interfaces 208 may take the form of a touch interface configured for touch inputs, such as a mechanical interface (e.g., a button, slider, switch, etc.) or a touch-sensitive interface (e.g., a capacitive or resistive touch surface, etc.), among other possibilities. One or more of input interfaces 208 may take the form of a visual-capture device, such as a camera that is configured to capture visual data (e.g., still images and/or video) corresponding to HUD device 200's surroundings or another sensor configured to facilitate determining the position and/or movement of HUD device 200's wearer's eyes, among other possibilities. One or more of input interfaces 208 may take the form of a sound-capture device, such as a microphone or microphone array configured to capture sound (e.g., speech commands) from HUD device 200's surroundings, among other possibilities. One or more of input interfaces 208 may take the form of a HUD alignment sensor, such as an accelerometer, a gyroscope, a magnetometer, a light sensor, or some other sensor configured to facilitate (i) determining HUD device 200's orientation, position, and/or location and/or (ii) interpreting HUD device 200's wearer's head movements and the like, among other possible alignment sensors. HUD device 200 may additionally or alternatively include other types of input interface.

Display 210 may include one or more display systems that are generally configured to output visualizations to the wearer of HUD device 200. In example embodiments, display 210 may include one or more lens elements comprising a material that facilitates displaying visualizations and allowing the wearer of HUD device 200 to see through the one or more lens elements. Display 210 may further include one or more projector units configured to project a visualization onto and/or through one or more lens elements. Display 210 may additionally or alternatively include one or more waveguides or other optical components that facilitate providing a visualization to one or more eyes of the wearer of HUD device 200. Further yet, display 210 may additionally or alternatively include one or more lasers, LEDs, or other light sources whose output may be steerable to provide a visualization to one or more eyes of the wearer of HUD device 200. In some implementations, HUD device 200 may include a single display (e.g., a monocular HUD) or two displays (e.g., a binocular HUD), among other possibilities.

Output system 212 may include one or more output systems that are generally configured to provide a sensory output to the wearer of HUD device 200. In this respect, display 210 is one example of output system 212. Other examples include (i) a sound output system that is configured to output audible and/or inaudible sound (e.g., one or more speakers, one or more amplifiers, one or more text-to-speech engines, one or more audio processors, etc.) or (ii) a haptic output system that is configured to output haptics (e.g., one or more vibrators or other actuators), among other possible examples.

In at least some implementations, HUD device 200 may be configured with object-detection functionality. To facilitate such functionality, object-detection module 214 may include one or more object-detection modules that facilitate HUD device 200 performing object detection locally, leveraging an external device to perform object detection on behalf of HUD device 200, or some combination thereof. For instance, in some implementations, object-detection module 214 may include (i) one or more object-detection models that receive as input visual data (e.g., images and/or video) from input interface 208 (e.g., a camera or the like) and output an indication of whether the visual data included at least one instance of an object that the model was trained to detect and/or (ii) one or more object-detection APIs that leverage object-detection functionality of another device, such as a companion device 104, management computing system 106, a third-party service that performs object detection, etc. Other object-detection modules and/or object-detection arrangements are also possible. In some implementations, object-detection module 214 may be wholly or partially integrated with data storage 204.

In at least some implementations, HUD device 200 may be configured with speech-processing functionality. To facilitate such functionality, speech-processing module 216 may include one or more speech-processing modules that facilitate HUD device 200 locally performing speech processing on sound captured by input interface 208 (e.g., one or more microphones), leveraging an external device to perform speech processing on behalf of HUD device 200, or some combination thereof. For instance, in some implementations, speech-processing module 216 may include (i) one or more wake-word engines, (ii) one or more speech recognition engines, (iii) one or more natural language processors, and/or (iv) one or more speech-processing APIs that leverage speech-processing functionality of another device, such as a companion device 104, management computing system 106, a third-party service that performs speech processing, etc. Other speech-processing modules and/or speech-processing arrangements are also possible. In some implementations, speech-processing module 216 may be wholly or partially integrated with data storage 204.

A person of ordinary skill in the art will appreciate that HUD device 200 of FIG. 2 is but one simplified block diagram of an example HUD device and should not be construed as limiting. For instance, the components of a HUD device may include additional components not illustrated, may have more or less of the illustrated components, and/or may have components arranged and/or integrated in different manners.

III. Example Functions

In practice, a given fulfillment establishment (e.g., a warehouse, consumer retail store, etc.) is typically stocked with inventory that includes a variety of different items that are located throughout the establishment. The given fulfillment establishment typically has a respective code or the like (e.g., SKU) assigned to each unique item (e.g., package of goods) that helps facilitate tracking and monitoring the establishment's inventory. Each unique item may be stored in a respective primary location within the given fulfillment establishment, such as at a particular spot on a particular shelf that is down a particular aisle within a particular zone at the establishment. The given fulfillment establishment may have signage or the like on the zones, aisles, shelves, etc. that help facilitate locating the designated spots for each unique item.

In operation, fulfillment-establishment personnel (e.g., "pickers") are tasked with fulfilling customer orders received by the fulfillment establishment. Typically, each picker uses a respective fulfillment pushcart, basket, or the like that may include one or more item receptacles (e.g., bins, bags, etc.) that may be arranged in an item-receptacle array where the picker deposits retrieved items (e.g., a 2×2, 3×3, 2×4, etc. array of item receptacles). To help facilitate the fulfillment operations, the given fulfillment establishment may leverage aspects of network configuration 100. For instance, in example implementations, each picker may wear a respective wearable computing device 102 and perhaps also utilizes one or more respective companion devices 104 to aid in the fulfillment process.

For purpose of illustration only, example functions that may be carried out by a wearable computing device and/or management computing system to aid the fulfillment process will be described in the context of example network configuration 100 of FIG. 1 with wearable computing device 102 being a HUD device. To help describe some of these functions, flow diagrams may also be referenced to describe combinations of functions that may be performed. In some cases, each flow-diagram block may represent a module or portion of software code that includes program instructions that are executable by a processor to implement specific logical functions or steps in a process. The software code may be stored on any type of computer-readable medium, such as non-transitory, computer-readable media. Moreover, flow-diagram blocks may be rearranged into different orders, combined into fewer blocks, separated into additional blocks, and/or removed based upon the particular embodiment.

Figure 3:
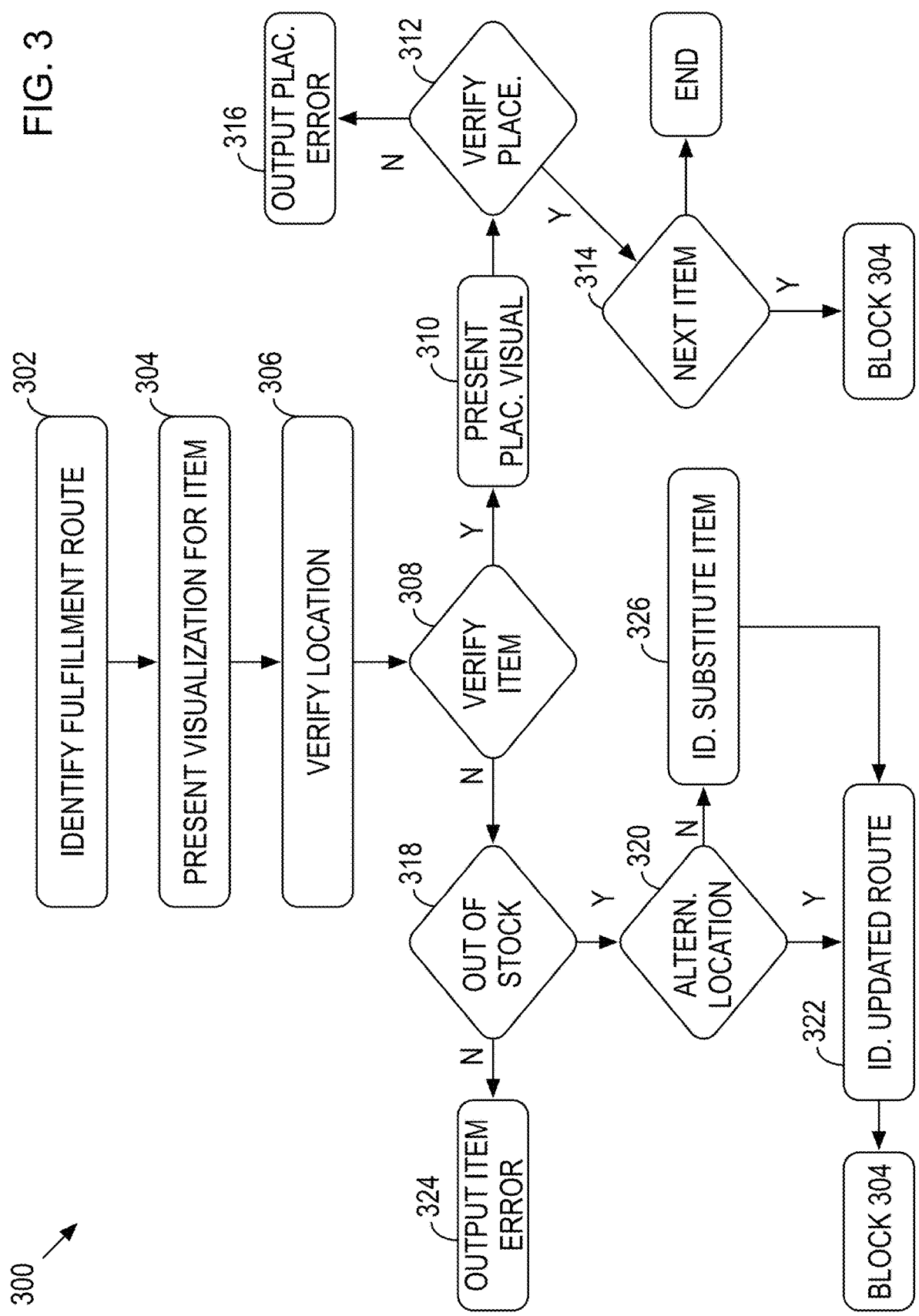
FIG. 3 depicts a flow diagram of example fulfillment-related functions.

Referring now to flow diagram 300 of FIG. 3, at block 302, HUD device 102 may identify a particular fulfillment route that a picker wearing HUD device 102 is to complete. In practice, before HUD device 102 identifies a particular fulfillment route, the picker assigned to HUD device 102 may first activate the device. For instance, the picker may power on HUD device 102 by providing a particular user input at HUD device 102 and then providing login credentials (e.g., a username and password for the picker), perhaps via voice commands to HUD device 102 or via user inputs at a software application on a companion device 104, among other possibilities. HUD device 102 may be activated in other manners as well.

Figure 6A:
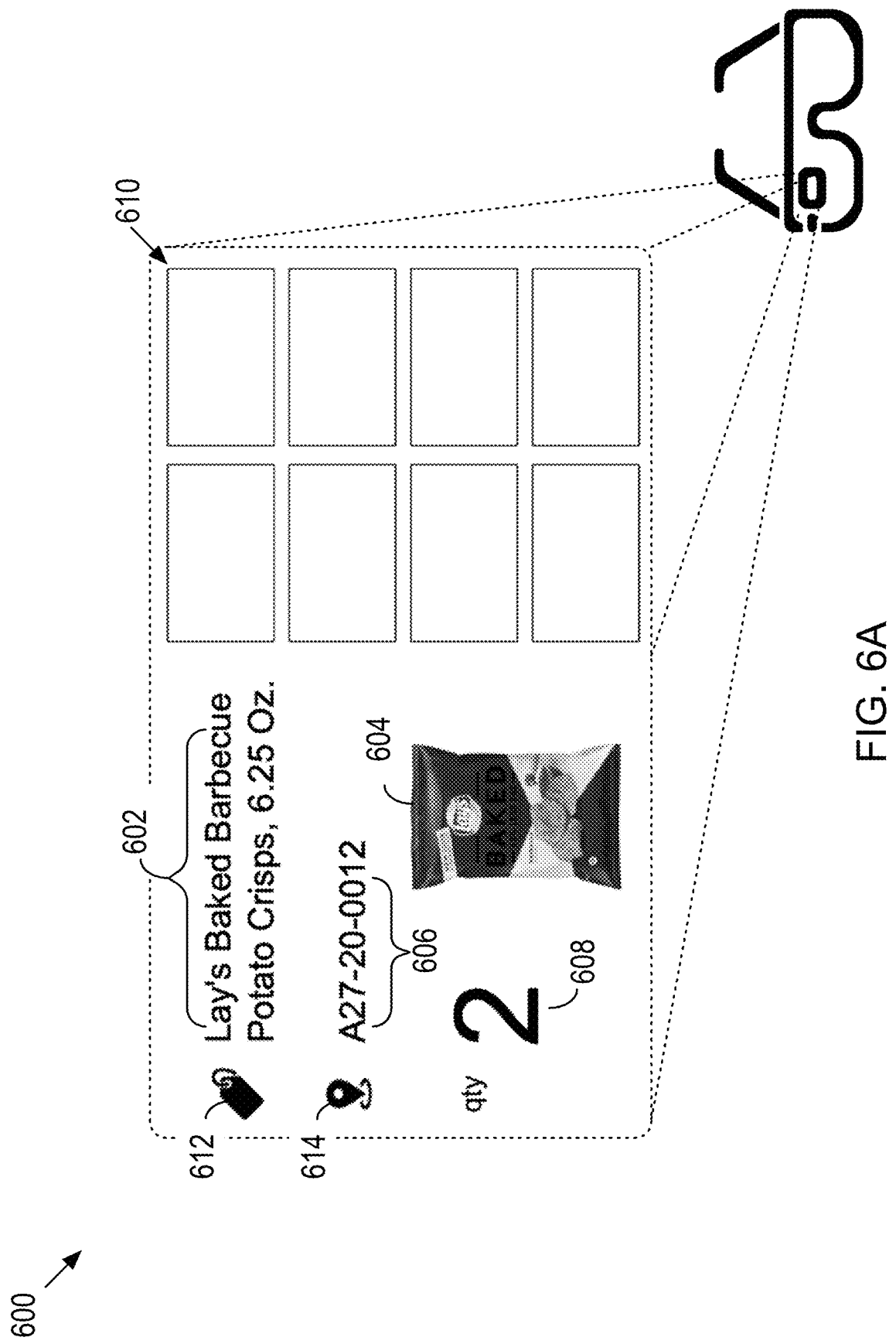
FIG. 6A depicts a simplified version of an example visualization corresponding to an item entry from an example fulfillment route.
Figure 6B:
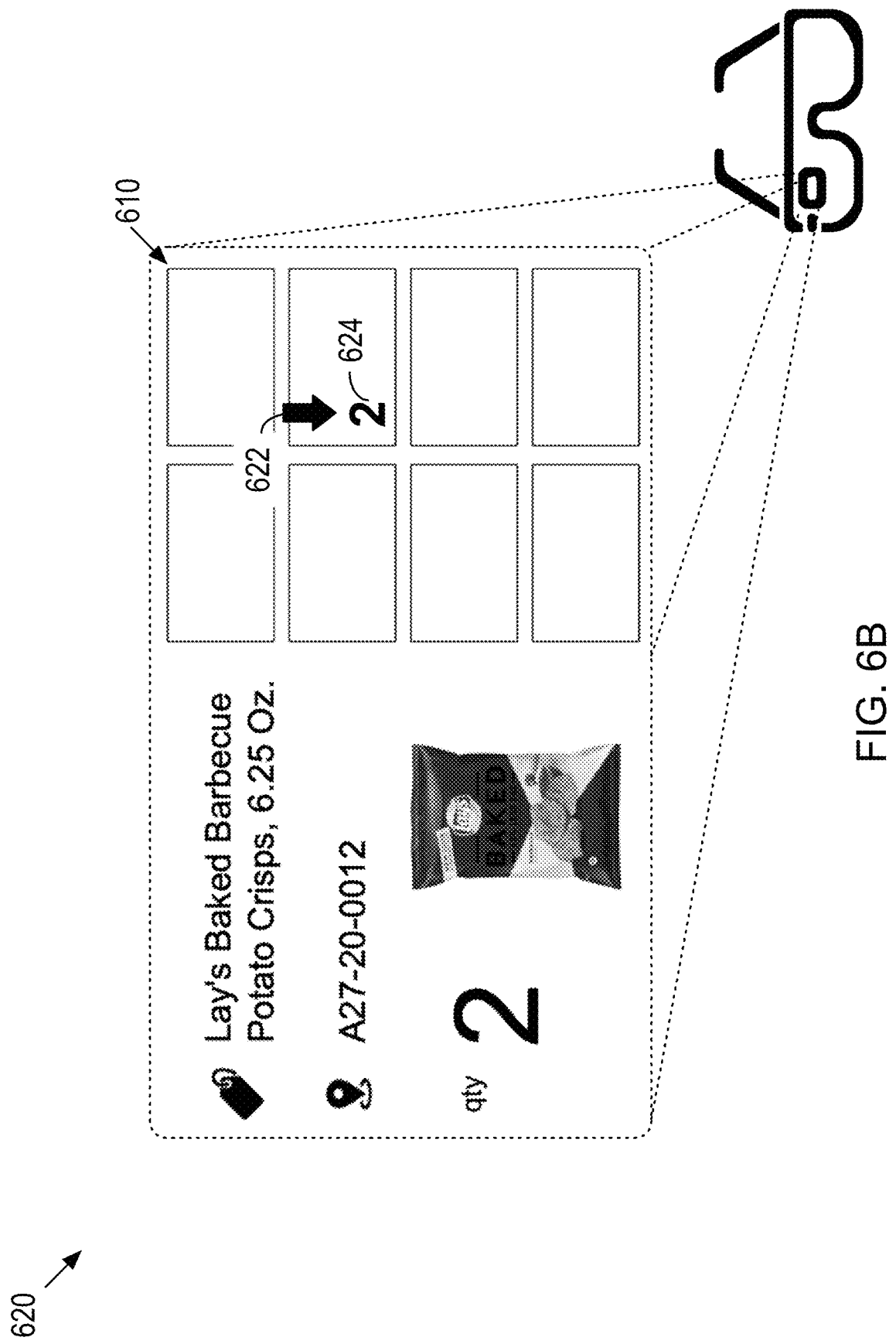
FIG. 6B depicts a simplified version of an example visualization that includes an example placement visualization.

In some implementations, as part of activating HUD device 102 (or otherwise), HUD device 102 may determine the arrangement of the picker's item-receptacle array, so that an appropriate mapping can be established between the real-world item-receptacle array and a visual representation of the item-receptacle array that may be presented by HUD device 102 to aid the picker's fulfillment task (an example of which is shown in FIGS. 6A-6B). In practice, HUD device 102 may determine the arrangement of the picker's item-receptacle array in a variety of manners.

As one possibility, HUD device 102 may receive one or more touch and/or voice inputs via HUD device 102's input interfaces (or via a companion device 104) that indicate the arrangement of the picker's real-world item-receptacle array. For example, HUD device 102 may receive one or more first inputs indicating the number of rows in the item-receptacle array and another one or more inputs indicating the number of columns in the item-receptacle array.

As another possibility, HUD device 102 may (i) instruct the picker to look at the picker's item-receptacle array, (ii) capture visual data (e.g., an image or video) of HUD device 102's view (perhaps in response to a voice or touch input), and (iii) determine, based on object-recognition functionality, the layout of the picker's item-receptacle array.

As yet another possibility, in scenarios where each picker at the given fulfillment establishment uses a "default" item-receptacle-array arrangement, HUD device 102 may retrieve data indicative of the default item-receptacle-array arrangement for the given fulfillment establishment from local storage, a companion device 104, or management computing system 106, among other possible sources. HUD device 102 may determine item-receptacle-array arrangements in other manners as well.

In any case, after HUD device 102 is activated, HUD device 102 may then identify a particular fulfillment route in a variety of manners. In general, HUD device 102 may identify a particular fulfillment route by (i) identifying one or more fulfillment routes available to the particular picker (e.g., fulfillment routes specifically assigned to the particular picker or fulfillment routes generally available to any picker at the given fulfillment establishment), (ii) receiving one or more inputs (e.g., at HUD device 102 and/or a companion device 104) that facilitate cycling through the available fulfillment routes and/or selecting a particular fulfillment route, and (iii) identifying the particular fulfillment route based on the received one or more inputs. In practice, management computing system 106 may maintain available fulfillment routes in data storage, and HUD device 102 may retrieve one or more of these fulfillment routes from management computing system 106 and then store the particular fulfillment route in its local data storage. HUD device 102 may identify a particular fulfillment route in other manners as well.

In example embodiments, a fulfillment route takes the form of a data structure that includes item information that facilitates fulfilling one or more customer orders. In at least some instances, a fulfillment route may include information for a plurality of unique items that correspond to multiple customer orders. While in other instances, a fulfillment route may include information for a single customer order.

Figure 4:
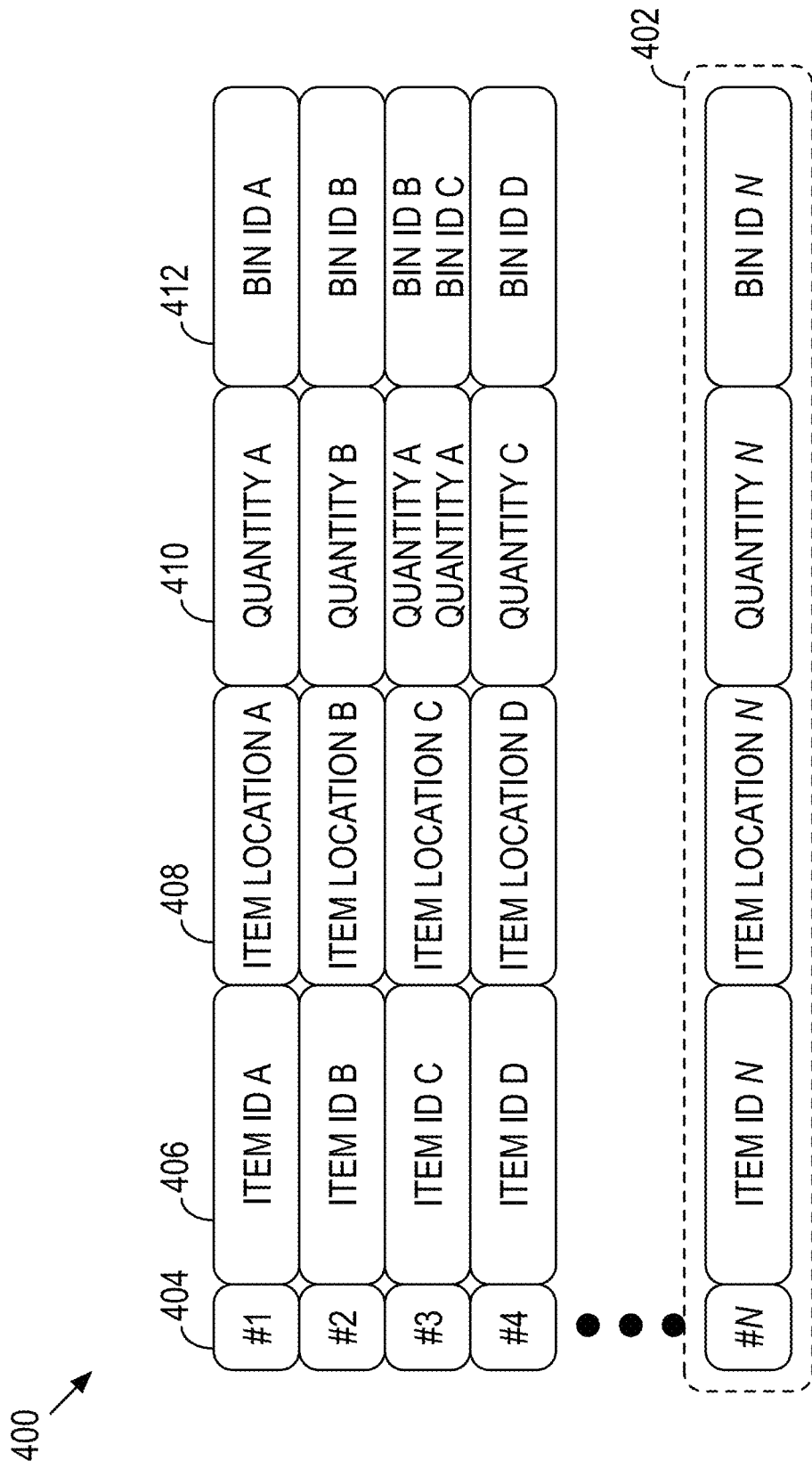
FIG. 4 provides a conceptual illustration of an example fulfillment route.

FIG. 4 provides a conceptual diagram of an example fulfillment route 400. As shown, fulfillment route 400 takes the form of a data structure comprising an ordered sequence of item entries 402, each of which includes a sequence number 404, an item identifier 406, an item-location identifier 408, an item quantity identifier 410, and an item-receptacle identifier 412. In practice, any of these identifiers (and any other identifier disclosed herein) may take the form of one or more (i) alphabetic, numeric, or alpha-numeric characters, (ii) symbols, and/or (iii) color indicators (among other possibilities) that help to distinguish one entity from another entity.

In fulfillment route 400, sequence number 404 identifies a position of one item entry 402 in relation to other item entries and generally defines the order in which a picker will be instructed to retrieve each respective item identified in fulfillment route 400. Item identifier 406 generally identifies a unique item, which may take the form of a description of the unique item (e.g., "Hefty Kitchen Trash Bags"), a code assigned to the unique item (e.g., a SKU, one or more UPCs, or the like), or data indicating a resource from which more information regarding the unique item can be obtained (e.g., a uniform resource identifier (URI) or the like for a graphics database comprising a graphic associated with the unique item), among other possible item identifiers. In some implementations, item identifier 406 may take the form of a combination of two or more different types of identifiers, such as a SKU, UPC, and description of the item. Item-location identifier 408 generally identifies a particular location (e.g., the item's primary location) within the given fulfillment establishment, which may take the form of a description of the particular location (e.g., "Zone A-Aisle 5-Shelf 3-Spot 101"), a code assigned to the particular location (e.g., "J3-16-0471"), or coordinates within a map of the given fulfillment establishment, among other possible item-location identifiers. Item quantity identifier 410 generally identifies a number of instances of a given item that is required (e.g., a numeric indication). Item-receptacle identifier 412 generally identifies a target item receptacle from the picker's real-world item-receptacle array to which a given item should be deposited, which may take the form of a description of the target item receptacle (e.g., "front left," "back right," "middle center," etc.), a textual or color code assigned to the particular item receptacle, or some other indication that helps distinguish one item receptacle from the other item receptacles in the picker's item-receptacle array, among other possible item-receptacle identifiers. As shown in fulfillment route 400, multiple target receptacles may receive a respective quantity of the same item.

A person of ordinary skill in the art will appreciate that fulfillment route 400 of FIG. 4 is but one simplified example fulfillment route and should not be construed as limiting. Indeed, other fulfillment routes may include additional aspects not illustrated and/or may have more or less of the illustrated aspects.

As suggested above, in example implementations, item entries of a fulfillment route may be sequenced in a particular order, which may be defined in a variety of manners. As one possibility, a given fulfillment route's sequence order may be defined in a manner that optimizes the picker's route through the given fulfillment establishment, such as in terms of distance traveled and/or time required to complete the given fulfillment route. As one particular example, sequence orders may be defined based on one or more heuristic techniques that seek to address shortest-path and/or traveling-salesperson problems. In example embodiments, management computing system 106 may receive optimized fulfillment routes from a third-party computing system that is configured to optimize pick routes based on information regarding the layout of the given fulfillment establishment and a respective location within the given fulfillment establishment for each item within a given fulfillment route. In other example embodiments, management computing system 106 itself may be configured to generate optimized pick routes, and in yet further example embodiments, HUD device 102 and/or a corresponding companion device 104 (e.g., a smartphone or the like) may be so configured. Fulfillment-route sequence orders may be defined in other manners as well.

Figure 5A:
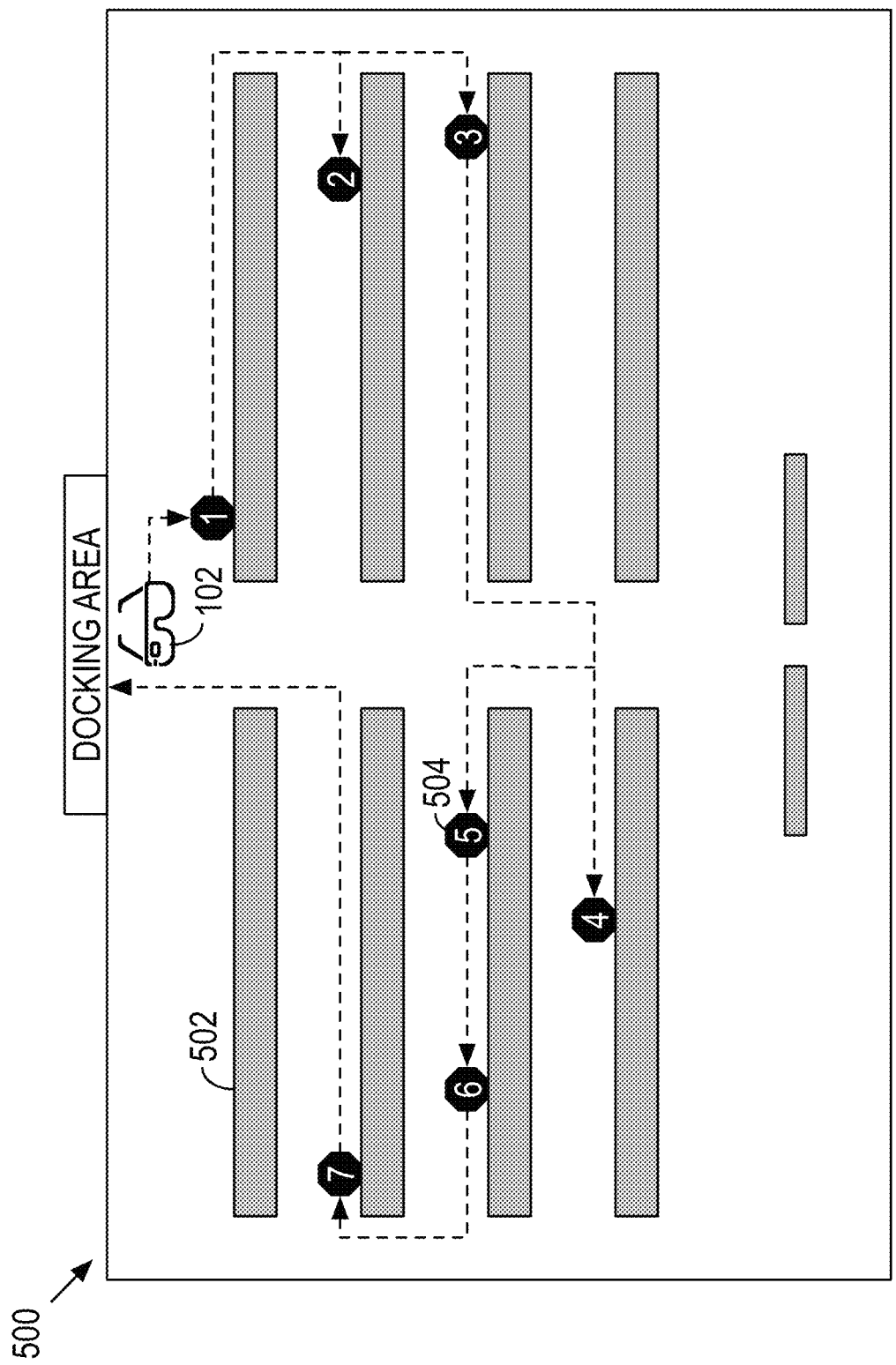
FIG. 5A provides a conceptual illustration of how an example fulfillment route maps to an example fulfillment establishment.

FIG. 5A provides a conceptual illustration of how an example fulfillment route maps to an example fulfillment establishment. In particular, FIG. 5A provides a bird's eye view of a fulfillment area 500 of the given fulfillment establishment that includes a layout comprising various shelving units 502 that define aisles through which pickers wearing HUD devices 102 navigate to particular item locations within shelving units 502. Stop signs 504 identify respective item locations corresponding to the item entries of a particular fulfillment route with the numeral corresponding to the respective item entry's sequence number within the fulfillment route. The dashed lines represent a target pathway that HUD device 102 should traverse over the course of fulfilling the particular fulfillment route.

Returning to FIG. 3, after HUD device 102 identifies a particular fulfillment route, at block 304, HUD device 102 may present, via HUD device 102's display, a first visualization corresponding to a first item entry from the particular fulfillment route. HUD device 102 may be configured to perform this function in a variety of manners, such as by causing a projector or the like to present the first visualization on one or more lens elements of HUD device 102, among other possibilities.

In practice, the first visualization corresponding to the first item entry from the particular fulfillment route may take various forms and may include a variety of information. In example embodiments, the first visualization may include one or more of (i) a visual indication of a particular item (e.g., one or more of a picture, name, UPC, description, price, or size of the particular item), (ii) a visual indication of a particular item location (e.g., the particular item's primary location) where the particular item might be located, (iii) a visual indication of a quantity of the particular item that should be retrieved, and/or (iv) a visual representation of the item-receptacle array, among other possible visualization elements. For instance, the first visualization may include at least a visual indication of a first item location, which may serve to instruct the picker to proceed to that first location within the given fulfillment establishment.

FIG. 6A provides a simplified illustration of an example visualization 600 corresponding to an item entry from a particular fulfillment route. In example implementations, HUD device 102 may overlay visualization 600 onto the picker's real-world view, such as at a sight location that is set off to the right of the picker's forward-facing line of sight, among other possibilities. As shown, visualization 600 includes (i) a textual indication 602 of the particular item as well as a graphical indication 604 of the particular item, (ii) a textual indication 606 of a location of the particular item, (iii) a textual indication 608 of a quantity of the particular item, and (iv) an item-receptacle array visualization 610. Visualization 600 also includes item-status logo 612 and location-status logo 614. Numerous other example visualizations are also possible. In some instances, visualization 600 may not include item-receptacle array visualization 610, which instead may be displayed at a later point in time (e.g., at block 310 of FIG. 3).

In operation, the picker may proceed to the first item location (e.g., the first item's primary location) presented by HUD device 102. Returning to FIG. 3, at block 306, HUD device 102 may verify that HUD device 102 is located at the first item location corresponding to the first item entry from the particular fulfillment route. In example embodiments, HUD device 102 may be considered to be at a given item location when HUD device 102's current position either (i) directly matches the given item location or (ii) is within a predetermined proximity to the given item location (e.g., within a 1-meter radius around the given item location), among other possibilities. In practice, the HUD device 102 may verify that HUD device 102 is located at the first item location in a variety of manners.

As one possibility, HUD device 102 and/or a corresponding companion device 104 may be provisioned with indoor-positioning technology (e.g., magnetic-positioning technology, dead-reckoning technology, access-point proximity technology, beacon technology, etc.) that facilitates determining where HUD device 102 is located within the given fulfillment establishment, and HUD device 102 may leverage such technology to verify that HUD device 102 is located at the first item location.

As another possibility, HUD device 102 may receive one or more touch or voice inputs from which HUD device 102 may infer that it is located at the first item location (e.g., "Hey HUD, I am standing in front of marker A27-20-0012"). Relatedly, HUD device 102 and/or a companion device 104 may scan a barcode or the like associated with the first item location from which HUD device 102 may infer that it is located at the first item location.

As yet another possibility, HUD device 102 may (i) instruct the picker to look at a placard or the like at the picker's position, (ii) capture visual data (e.g., an image or video) of HUD device 102's view (perhaps in response to voice or touch input), (iii) determine, based on object-recognition functionality, that the visual data includes a particular signpost object (e.g., a particular placard or a particular object or the like within a placard) that is associated with the first item location, and (iv) infer that HUD device 102 is located at the first item location based on the presence of the particular signpost object in the visual data.

Figure 5B:
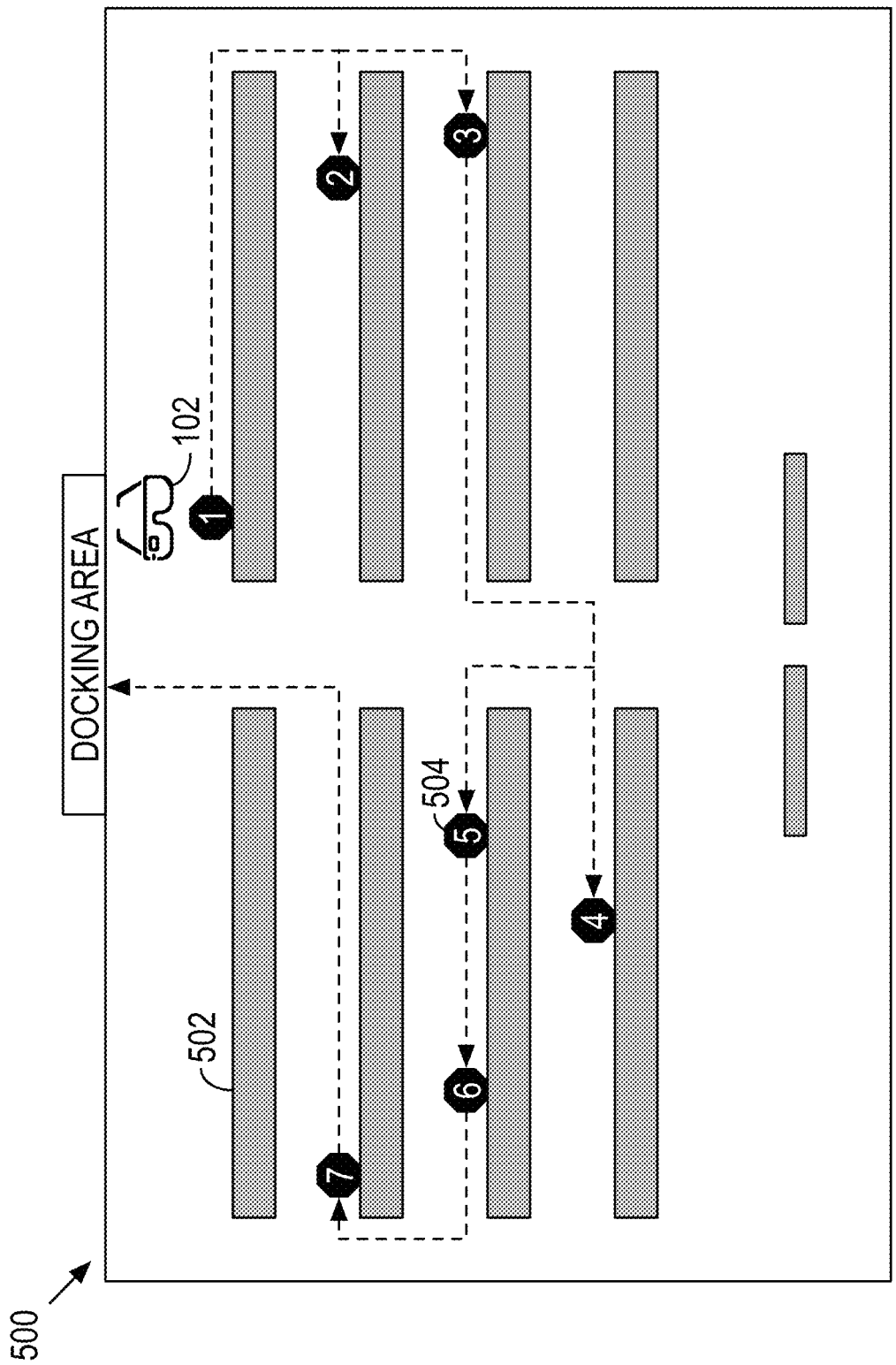
FIG. 5B provides a conceptual illustration of a picker progressing through the example fulfillment route of FIG. 5A.

HUD device 102 may verify that it is located at the first item location in other manners as well. FIG. 5B shows the bird's eye view of fulfillment area 500 from FIG. 5A when HUD device 102 is located at the first item location. Notably, in some implementations, HUD device 102 may not attempt to verify that it is located at the first item location (e.g., block 306 may not be part of flow diagram 300).

Back to FIG. 3, at block 308, HUD device 102 may be configured to verify whether there is at least one instance of the first item identified in the first item entry from the particular fulfillment route. In other words, HUD device 102 may proceed to attempt to verify that there is stock of the first item at the first item location. HUD device 102 may attempt to make the item verification in a variety of manners.

As one possibility, HUD device 102 may receive one or more touch or voice inputs from which HUD device 102 may infer that at least one instance of the first item is present. For example, HUD device 102 may (i) receive a voice input (e.g., "Hey HUD, here is a bag of flaming hot cheetos"), (ii) analyze that voice input utilizing one or more on-board speech processing modules or one or more speech processing capabilities of another device (e.g., a companion device 104), and (iii) use that analysis to verify that the voice input indicated that at least one instance of the first item is present. HUD device 102 may perform item verification based on voice input in other manners as well.

As another possibility, HUD device 102 may receive a visual input (e.g., image or video data) and utilize object-detection functionality to verify that at least one instance of the first item is present. For example, HUD device 102 may (i) in response to the verification from block 306, instruct the picker to look at an instance of the first item, (ii) capture a visual input (e.g., image or video data) of HUD device 102's view (perhaps in response to a voice or touch input or particular "picking" action captured in a preliminary visual input that triggers the item-verification visual-input capture), (iii) determine, based on object-recognition functionality, that the visual input includes an instance of the first item, and (iv) use that determination to verify that at least one instance of the first item is present. In some implementations, HUD device 102 may more specifically (i) identify, from a plurality of possible object-detection models, a given object-detection model that was trained to detect instances of the first item (perhaps based on an identifier of the first item and an object-detection-model lookup table or the like), (ii) execute the given object-detection model corresponding to the first item utilizing the visual input, and (iii) verify that at least one instance of the first item is present if executing the model returns an object-detection probability that exceeds a threshold value. In example embodiments, some object-detection models may be trained to recognize particular product and/or brand logos, labeling, or the like. Additionally or alternatively, some object-detection models may be trained to detect particular shapes, volumetric density, encodings (e.g., machine-readable codes embedded in item packaging) or the like. Thus, in example implementations, HUD device 102 may be configured to identify a particular object-detection model that is applicable to the first item, such as based on an identifier or the like associated with the first item. In any case, HUD device 102 may perform item verification based on visual input in other manners as well.

As yet another possibility, HUD device 102 may receive data from a companion device 104 and based on the received data, verify whether at least one instance of the first item is present. For example, a companion device 104 may take the form of an RFID detection device worn by the picker that may transmit data to HUD device 102 if RFID detection device detects an RFID tag. When the picker retrieves an instance of the first item, the RFID detection device may pass in proximity to an RFID tag positioned next to where the first item is stored and detect the RFID tag. The RFID detection device may transmit to HUD device 102 data indicative of the detected RFID tag from which HUD device 102 may determine that the detected RFID tag corresponds to the first item. As another example, a companion device 104 may take the form of a barcode scanner that may transmit data to HUD device 102 after the barcode scanner scans a barcode, QR code, or the like of an item, which may be triggered by an input provided by the picker. HUD device 102 may receive, from the barcode scanner, data indicative of the scanned code (e.g., data indicative of a particular UPC) and then determine whether the received data corresponds to the first item (e.g., by determining whether a scanned UPC matches any UPC that corresponds to the first item). HUD device 102 may perform item verification based on data from a companion device 104 in other manners as well.

A person of ordinary skill in the art will appreciate that there are various other manners by which HUD device 102 may perform item verification.

In some implementations, after HUD device 102 verifies that at least one instance of the first item is present, HUD device 102 may provide an output corresponding to that verification, such as a visual (e.g., a change to a visual appearance of a given receptacle in the item-receptacle array visualization 610) and/or audible output (e.g., a tone indicative of a correct item). In one particular example, returning to FIG. 6A, HUD device 102 may change the appearance of item-status logo 612, such as by changing its color, causing an animation to occur, displaying a different type of logo, etc.

In some implementations, HUD device 102 may attempt to verify whether there is at least one instance of the first item identified in the first item entry from the particular fulfillment route while HUD device 102 detects that it is positioned at the first item location. In this respect, in some cases, HUD device 102 may be configured such that HUD device 102 is unable to attempt to make an item verification unless HUD device 102 verifies that it is at the item location identified in the visualization from block 304. In other implementations, HUD device 102 may attempt to verify whether there is at least one instance of the first item identified in the first item entry from the particular fulfillment route independent of any verification from block 306. Other possibilities also exist.

In any event, if HUD device 102 verifies that there is at least one instance of the first item identified in the first item entry from the particular fulfillment route, at block 310, HUD device 102 may be configured to present, via HUD device 102's display, a placement visualization that includes (i) a visual representation of the item-receptacle array and (ii) at least one placement indication within the item-receptacle array visualization that identifies a target item receptacle that should receive an instance of the first item. Notably, in instances where multiple target item receptacles are to receive an instance of the first time, the placement visualization may include multiple placement indications within the item-receptacle array visualization. In practice, the placement visualization can take a variety of forms.

FIG. 6B provides a simplified version of an example visualization 620 that includes an example placement visualization. As shown, visualization 620 is an updated version of visualization 600 of FIG. 6A and includes item-receptacle array visualization 610, a placement indication 622, and placement quantity indication 624, which collectively comprises the example placement visualization. Numerous other example placement visualizations are also possible. As mentioned before, in some implementations, visualization 600 of FIG. 6A may not include item-receptacle array visualization 610, and instead, HUD device 102 may display item-receptacle array visualization 610 in the first instance at block 310.

Returning to FIG. 3, at block 312, HUD device 102 may be configured to verify whether the at least one target item receptacle identified in the presented placement visualization received at least one instance of the first item. In this way, HUD device 102 may be configured to verify that the appropriate one or more target receptacles received the appropriate quantity of the first item. HUD device 102 may attempt to make placement verification in a variety of manners.

As one possibility, HUD device 102 may receive one or more touch or voice inputs from which HUD device 102 may infer that the at least one target item receptacle received at least one instance of the first item. For example, HUD device 102 may (i) receive a voice input (e.g., "Hey HUD, I placed cheetos in the orange bin"), (ii) analyze that voice input utilizing one or more on-board speech processing modules or one or more speech processing capabilities of another device (e.g., a companion device 104), and (iii) use that analysis to verify that the voice input indicated that the at least one target item receptacle received at least one instance of the first item. HUD device 102 may perform placement verification based on voice input in other manners as well.

As another possibility, HUD device 102 may receive a visual input (e.g., image or video data) and utilize object-detection functionality to verify that the at least one target item receptacle received at least one instance of the first item. For example, HUD device 102 may (i) instruct the picker to look at the picker's item-receptacle array (perhaps in response to a voice or touch input or a particular "placing" action captured in a preliminary visual input that triggers the placement-verification visual-input capture), (ii) capture a visual input (e.g., image or video data) of HUD device 102's view (perhaps in response to a voice or touch input), (iii) determine, based on object-recognition functionality, that the visual input includes an instance of the first item within the target item receptacle, and (iv) use that determination to verify that the at least one target item receptacle received at least one instance of the first item. In some implementations, HUD device 102 may more specifically (i) identify, from a plurality of possible object-detection models, a first object-detection model that was trained to detect instances of the first item (perhaps based on an identifier of the first item and an object-detection-model lookup table or the like), (ii) execute the first object-detection model corresponding to the first item utilizing the visual input, (iii) verify that at least one instance of the first item is present if executing the first model returns an object-detection probability that exceeds a threshold value, (iv) execute a second-object detection model that was trained to detect the at least one target item receptacle (e.g., a model trained to identify a particular colored item receptacle), (iv) verify that the at least one target item receptacle is present if executing the second model returns an object-detection probability that exceeds a threshold value, and (v) based on the two verifications, make a determination that the at least one target item receptacle received at least one instance of the first item. In any case, HUD device 102 may perform placement verification based on visual input in other manners as well.

A person of ordinary skill in the art will appreciate that there are various other manners by which HUD device 102 may perform placement verification.

Notably, in instances where the particular fulfillment route dictates that multiple target item receptacles are to receive an instance of the first item, HUD device 102 may attempt to make a placement verification for each respective target item receptacle. Similarly, in instances where the particular fulfillment route dictates that a given item receptacle is to receive multiple instances of the first item, HUD device 102 may attempt to make multiple placement verifications for the given target item receptacle. In other words, HUD device 102 may be configured to verify that there was placement of required instances of the first item in the item-receptacle array. As one example to illustrate, a particular fulfillment route may dictate that there are two target item receptacles that are to receive the first item. HUD device 102 may first perform the functions of blocks 308-312 with respect to the first item for the first target item receptacle and then perform the functions of blocks 308-312 with respect to the first item for the second target item receptacle. Other example manners by which HUD device 102 handles multiple target item receptacles receiving a given item are also possible.

If HUD device 102 verifies the placement of the first item in the item-receptacle array (which may involve determining that the at least one target item receptacle received at least one instance of the first item), at block 314, HUD device 102 may determine whether the particular fulfillment route includes a next item entry corresponding to a next item that is to be placed in the item-receptacle array. If HUD device 102 determines that there is a next item entry, HUD device 102 may return to block 304 and begin performing the aforementioned functions for the next item entry. If HUD device 102 determines that there is no outstanding item entry, HUD device 102 may infer that the particular fulfillment route is completed and then output an audible and/or visual notification informing the picker that the fulfillment route has been completed and perhaps an instruction for the picker to return to a docking area or the like to drop off the filled item receptacles.

Returning to block 312, if HUD device 102 is unable to verify the placement of the first item in the item-receptacle array (which may involve determining that the at least one target item receptacle did not receive an instance of the first item), at block 316, HUD device 102 may be configured to output, via HUD device 102's display and/or other output system, a placement-error output that includes one or more of a visual, audible, or haptic output indicating that there was an error in verifying the placement of the first item. For example, HUD device 102 may output a sustained haptic vibration when an item was placed in the wrong receptacle, a visualization identifying the error (e.g., a red "X" within a given receptacle in the item-receptacle array visualization 610, text reading "Too many in the red bin," etc.), or an audible output describing the error (e.g., a synthesized voice stating "Not enough in the blue bin"), among various other possibilities.

Returning to block 308, if HUD device 102 is unable to verify that there is at least one instance of the first item identified in the first item entry at the first item location (e.g., the first item's primary location), at block 318, HUD device 102 may determine whether the first location lacks the first item. In other words, HUD device 102 may determine whether the first location is "out of stock" of the first item.

For instance, over time, the quantity of a respective item at its respective primary location may vary based on order fulfillments and re-stocking events (or lack of re-stocking events). At certain points in time, there may be no instances of the respective item at its respective primary location (e.g., the respective item may be "out of stock" at its primary location). HUD device 102 may be configured to determine whether a given location lacks a particular item in a variety of manners.

As one possibility, HUD device 102 may receive one or more touch inputs (e.g., a double-tap input or some other gesture input) that are indicative of an "out-of-stock input" from which HUD device 102 may infer that the first location lacks the first item.

As another possibility, HUD device may (i) receive a voice input (e.g., "Hey HUD, there are no cheetos here"), (ii) analyze that voice input utilizing one or more on-board speech processing modules or one or more speech processing capabilities of another device (e.g., a companion device 104), and (iii) use that analysis to determine that the first item location lacks any instance of the first item.

As yet another possibility, HUD device may receive, via HUD device 102's communication interface, a message indicating that the first item location is out of stock of the first item, which may originate from management computing system 106 or another wearable device 102 within the given fulfillment establishment, among other possibilities. HUD device 102 may determine whether the first item location lacks the first item in other manners as well.

If HUD device 102 determines that the first item location lacks the first item, at block 320, HUD device 102 may determine whether there are any alternative locations within the given fulfillment establishment that may have one or more instances of the first item. For instance, in some circumstances, despite a respective item being out of stock at its primary location, there may be one or more alternative locations within the given fulfillment establishment that have some stock of the respective item, such as at a display location, a stock room, etc. However, in other circumstances, the given fulfillment establishment as a whole may be out of stock of the respective item.

In practice, HUD device 102 may determine whether there are any alternative locations within the given fulfillment establishment that may have one or more instances of the first item in a variety of manners. As one possibility, HUD device 102 transmit an alternative-location inquiry to another entity, such as management computing system 106 (or perhaps a companion device 104 or another wearable computing device 102), where the alternative-location inquiry may include an identifier of the first item. The other entity may maintain or have access to a database that includes information regarding establishment locations that hold stock of the first item. For instance, management computing system 106 may be configured to maintain an up-to-date record (perhaps in real-time) of the given fulfillment establishment's stock for its whole inventory of items that may include one or more respective locations for each item and the respective quantity of stock at each location. In any case, after transmitting the alternative-location inquiry, HUD device 102 may receive data from the other entity identifying one or more alternative locations (if any exists) within the given fulfillment establishment that may have one or more instances of the first item.

As another possibility, HUD device 102 may itself maintain a local database or the like that includes information regarding establishment locations that hold stock of the first item and may then identify one or more alternative locations (if any exists) from the local database. HUD device 102 may update its local database or the like based on past fulfillments by pickers utilizing HUD device 102 and information from other devices, such as management computing system 106, companion devices 104, and/or or other wearable computing devices 102.

HUD device 102 may determine whether there are any alternative locations within the given fulfillment establishment that may have one or more instances of the first item in other manners as well.

If HUD device 102 identifies at least one alternative location of the first item, at block 322, HUD device 102 may then identify an updated fulfillment route that includes an item entry that identifies the at least one alternative location for the first item. In some cases, this item entry may be an updated version of the original item entry for the first item, and in other instances, this item entry may be a new item entry for the first item. In any case, HUD device 102 may identify an updated fulfillment route in a variety of manners.

As one possibility, HUD device 102 may communicate with another entity, such as management computing system 106 (or perhaps a companion device 104 or another wearable computing device 102), and receive an indication of the updated fulfillment route that includes the item entry that identifies the at least one alternative location for the first item. For instance, in example implementations, management computing system 106 may receive a request from HUD device 102 from which management computing system 106 determines that an updated fulfillment route may be warranted. In some instances, such a request may be an alternative-location inquiry or a part thereof, or such a request may be separate from any alternative-location inquiry, such as an explicit request for an updated fulfillment route, among other examples. In any case, based on the received request, management computing system 106 may be configured to obtain an updated fulfillment route that accounts for the at least one alternative location for the first item. For example, management computing system 106 may define an updated fulfillment route by updating at least the particular fulfillment route's sequence order to account for the at least one alternative location for the first item, which may involve applying one or more pick-route optimization techniques. As another example, management computing system 106 may send to a third-party computing system that is configured to optimize pick routes at least an indication of an alternative location for the first item and receive an updated fulfillment route that accounts for this new location for the first item.

In practice, an updated fulfillment route may include at least one modification to the original fulfillment route that may take various forms, such as (i) adding one or more new item entries to the original fulfillment route, (ii) re-ordering the sequence order of one or more item entries in the original fulfillment route, (iii) removing one or more item entries from the original fulfillment route, or (iv) updating one or more components of an item entry from the original fulfillment route (e.g., replacing an item-location identifier with an identifier for an alternative location), among other possibilities.

Figure 5C:
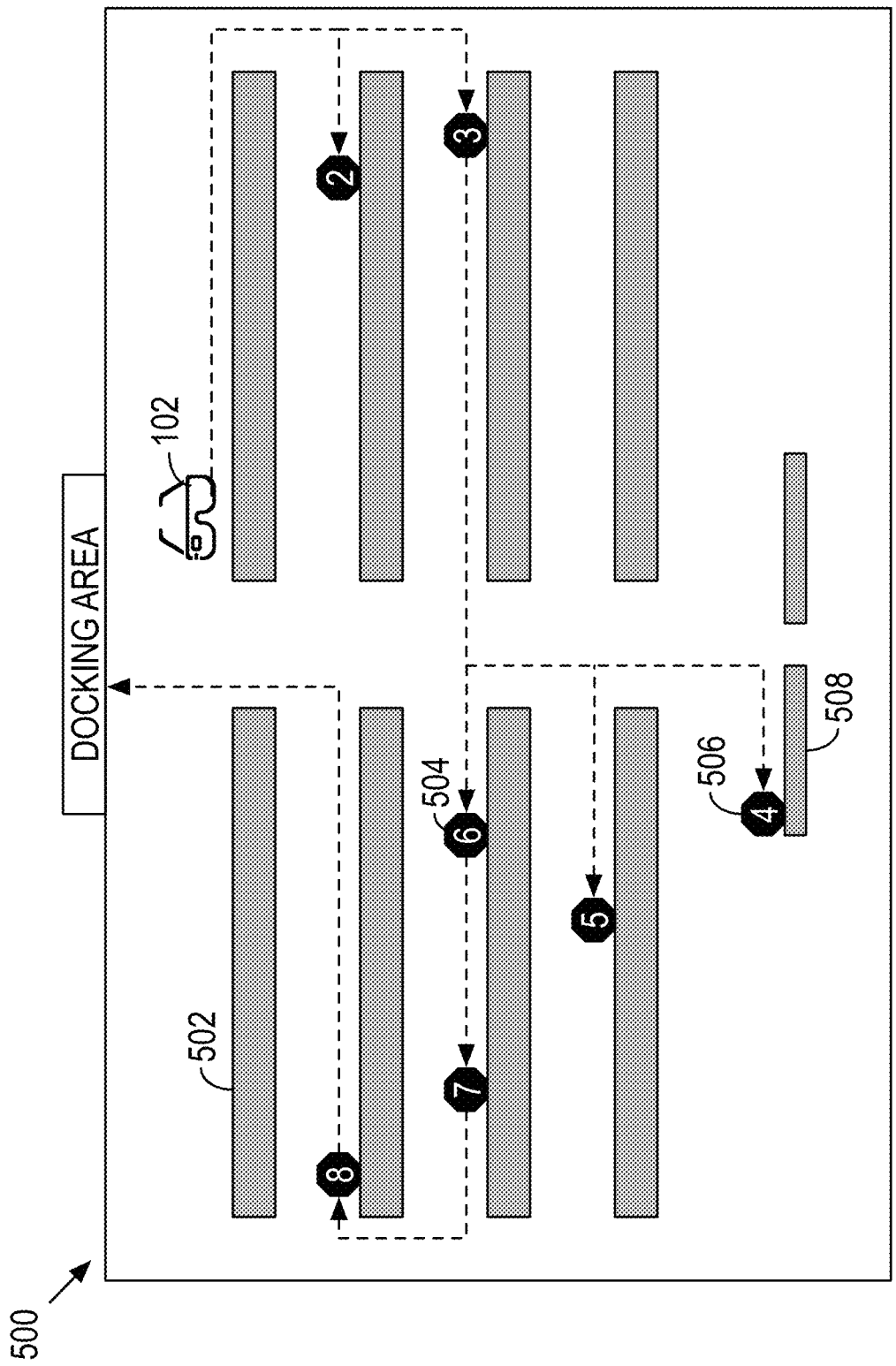
FIG. 5C provides a conceptual illustration of an updated fulfillment route mapped to the example fulfillment establishment illustrated in FIG. 5A.

As one illustrative example, FIG. 5C provides a conceptual illustration of an updated fulfillment route mapped to an example fulfillment establishment. In particular, FIG. 5C shows the bird's eye view of fulfillment area 500 from FIG. 5B along with stop sign 506 corresponding to an alternative location for the first item, which may be at a display stand 508 that has some stock of the first item. As shown, the numerals of a subset of the original stop signs have changed to reflect a revised sequence order of the updated fulfillment route. Likewise, there is a new dashed line that represents an updated target pathway that HUD device 102 should traverse over the course of fulfilling the updated fulfillment route.

As another possible manner by which HUD device 102 may identify an updated fulfillment route, HUD device 102 may include on-board capabilities that facilitate HUD device 102 generating updated fulfillment routes. For instance, HUD device 102 may be configured to generate an updated fulfillment route based at least on (i) an existing fulfillment route, (ii) an alternative item location within the given fulfillment establishment, and (iii) the layout of the given fulfillment establishment. HUD device 102 may identify an updated fulfillment route in other manners as well.

Notably, in some instances, there may be multiple, alternative locations for a given item within the given fulfillment establishment. In such instances, a fulfillment route may be updated to account for all alternative locations and then later updated again to remove any outstanding alternative locations if the given item is found at an earlier alternative location within the updated fulfillment route. Alternatively, a fulfillment route may be updated to account for a select alternative location and then later updated again to add another select alternative location if the first alternative location is also out of stock of the given item. In some implementations, one alternative location may be selected from multiple alternative locations based on a variety of metrics, such as respective likelihoods that the alternative locations will have the given item in stock and/or respective measures of pathway deviation from the original target pathway corresponding to the original fulfillment route (e.g., in terms of distance traveled and/or amount of time spent by the picker to traverse the updated pathway), among other possibilities.

After HUD device 102 identifies an updated fulfillment route at block 322, HUD device 102 may then return to block 304 where HUD device 102 may present, via the HUD device 102's display, a visualization for the next item entry in the updated fulfillment route. Depending on the updated fulfillment route, in some instances, the next item entry may correspond to an alternative item location for the first item, while in other instances, the next item entry may correspond to a different item from the original fulfillment route.

Returning to block 318, if HUD device 102 is unable to determine that the first item location lacks the first item, at block 324, HUD device 102 may be configured to output, via HUD device 102's display and/or other output system, an item-error output that includes one or more of a visual, audible, or haptic output indicating that there was an error in verifying the first item and/or an error in identifying an out-of-stock occurrence. For example, HUD device 102 may output a pulsating haptic vibration that indicates a general item error, a visual and/or audible output identifying the error (e.g., text reading "I could not verify the energizer batteries"), or a visual and/or audible output that attempts to resolve the error (e.g., a synthesized voice stating "Are we out of stock? If yes, double tap again"), among various other possibilities.

Returning to block 320, if HUD device 102 is unable to identify at least one alternative location of the first item, at block 326, HUD device 102 may identify a substitute item for the first item. In example implementations, a substitute item may be an item that is substantially similar to the first item. For example, a given item (e.g., SKU) typically has an associated brand, one or more quantitative characteristics (e.g., number of goods within a discrete package), and one or more qualitative characteristics (e.g., organic, inorganic, chocolate flavored, etc.). A substitute for the given item may be (i) an item of a different brand that has the same quantitative and qualitative characteristics of the given item (e.g., a generic version of a name-brand item), (ii) an item of the same brand as the given item but that has one or more different quantitative and/or qualitative characteristics (e.g., two six packs instead of a single twelve pack of Coke, organic apples instead of inorganic oranges, etc.), or (iii) an item of a different brand that has one or more different quantitative and/or qualitative characteristics (e.g., a second brand of 12-ounces of pasta instead of a first brand of 8-ounces of pasta), among other possibilities.

In practice, HUD device 102 may identify a substitute item for the first item in a variety of manners. As one possibility, HUD device 102 may communicate with another entity, such as management computing system 106 (or perhaps a companion device 104 or another wearable computing device 102), and receive an indication of a substitute item for the first item (e.g., in the form of an updated fulfillment route or otherwise). For instance, in example implementations, management computing system 106 may receive a request from HUD device 102 from which management computing system 106 may determine that a substitute item is required for the first item. In some instances, such a request may be an alternative-location inquiry or a part thereof from block 320, or such a request may be separate from any alternative-location inquiry, such as an explicit request for a substitute item. In any case, based on the received request, management computing system 106 may be configured to identify a substitute item for the first item, which may involve management computing system 106 searching an inventory database or the like for a suitable substitute item (e.g., in terms of cost, brand, qualitative characteristics, quantitative characteristics, etc.), and then provide an indication of the substitute item to HUD device 102. In some instances, management computing system 106 identifying a substitute item may involve sending to customer device 108 a request to confirm that the substitute item is acceptable. In turn, customer device 108 may (i) receive a notification or the like of the request from management computing system 106, (ii) receive an input confirming or rejecting the substitute item after outputting an indication of the request, and (iii) send a message indicative of the received input to management computing system 106. Other examples are also possible.

As another possibility, HUD device 102 may identify a substitute item for the first item based on a local inventory database or the like stored within local data storage of the HUD device 102. HUD device 102 may identify a substitute item for the first item in other manners as well.

In any case, after or as part of HUD device 102 identifying a substitute item for the first item, HUD device 102 may return to block 322 where HUD device 102 identifies an updated fulfillment route and then provides a visualization for a next item in accordance with the updated fulfillment route. In many instances, the next item may be the substitute item given that comparable goods are often stored next to one another, but at least in some instances, the next item may not be the substitute item. Notably, HUD device 102 may return to the functions of blocks 320 and 326 after attempting to verify the presence of the first item at each possible alternative location for the first item.

Figure 7:
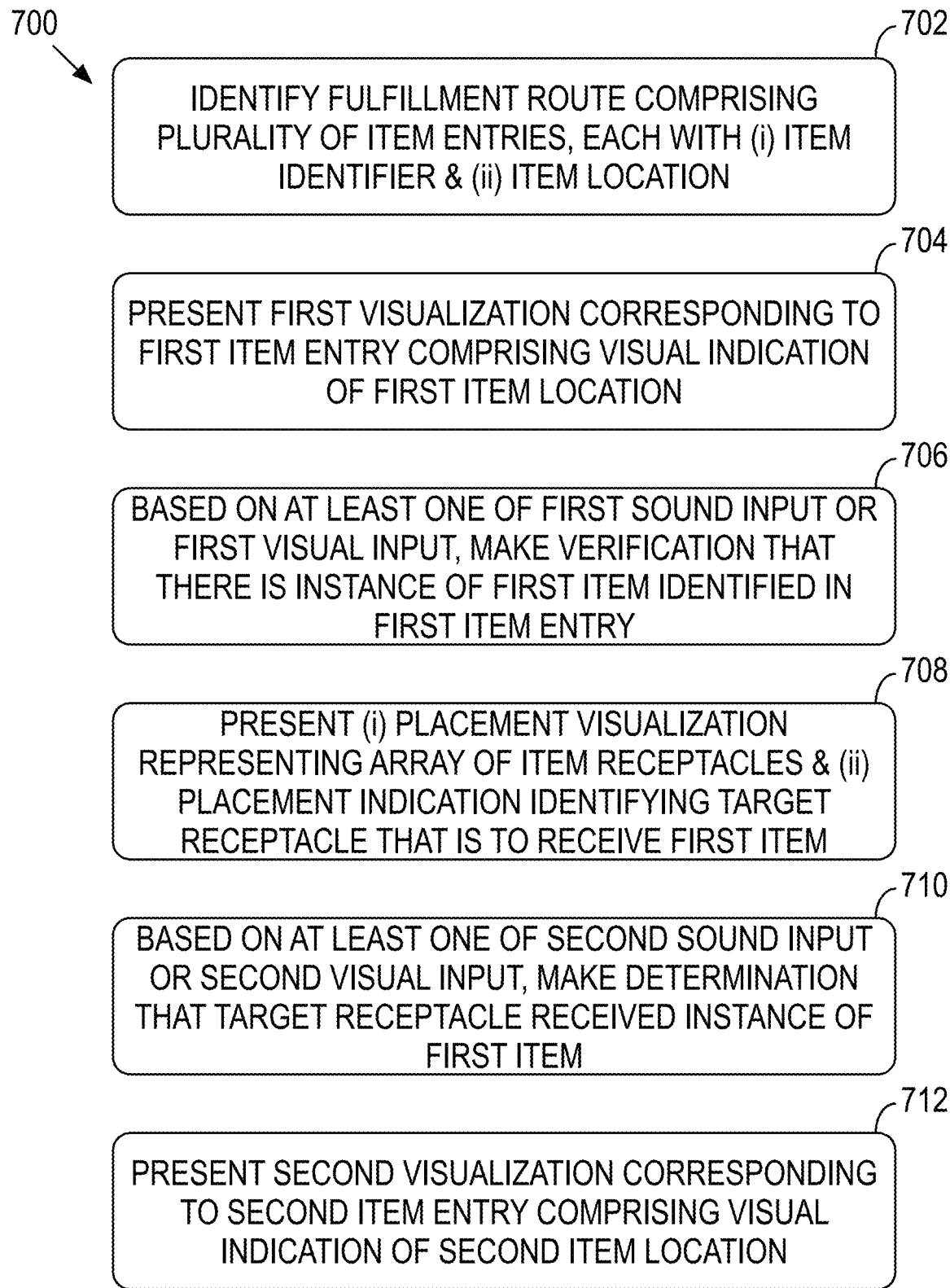
FIG. 7 is a flow diagram of example functions that a wearable computing device may perform.

In view of the foregoing, a person of ordinary skill in the art will appreciate that a HUD device may be configured to perform various combinations of functions to facilitate fulfilling customer orders. For instance, FIG. 7 provides a flow diagram 700 of example functions that HUD 102 may perform.

At block 702, HUD device 102 identifies a fulfillment route comprising a plurality of item entries, where each respective item entry comprises (i) an item identifier and (ii) an item location corresponding to a location within a given environment. At block 704, HUD device 102 presents, via its display, a first visualization corresponding to a first item entry from the fulfillment route, where the first visualization comprises a visual indication of a first item location. At block 706, HUD device 102, based on at least one of a first sound input or a first visual input received by HUD device 102, makes a verification that there is an instance of a first item identified in the first item entry. At block 708, HUD device 102, based on the verification, presents, via its display, (i) a placement visualization representing an array of a plurality of item receptacles in the given environment and (ii) at least one placement indication within the placement visualization identifying at least one target item receptacle of the plurality of item receptacles that is to receive the first item. At block 710, HUD device 102, based on at least one of a second sound input or a second visual input received by HUD device 102, makes a determination that the at least one target item receptacle received at least one instance of the first item. At block 712, HUD device 102, based on the determination, presents, via its display, a second visualization corresponding to a second item entry from the fulfillment route, wherein the second visualization comprises a visual indication of a second item location.

VI. Conclusion

Example embodiments have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "pickers," "personnel," "users" or other similar entities, this is for purposes of example and explanation only. The claims should not be construed as requiring action by such actors unless explicitly recited in the claim language.

The invention claimed is:

1. A heads-up display (HUD) device comprising:
at least one network interface configured to communicatively couple the HUD device to at least one data network;
a display configured to present one or more visualizations;
at least one processor;
a non-transitory computer-readable medium; and
program instructions stored on the non-transitory computer-readable medium that are executable by the at least one processor such that the HUD device is configured to:
identify a fulfillment route that is associated with at least one customer order that is to be fulfilled and that comprises a plurality of item entries, wherein each respective item entry comprises (i) an item identifier and (ii) an item location corresponding to a location within a given environment;
present, via the display, a first visualization corresponding to a first item entry from the fulfillment route, wherein the first visualization comprises a visual indication of a first item location;
based on at least one of a first sound input or a first visual input received by the HUD device, make a verification that there is an instance of a first item identified in the first item entry;
based on the verification, present, via the display, (i) a placement visualization representing an array of a plurality of item receptacles in the given environment and (ii) at least one placement indication within the placement visualization identifying at least one target item receptacle of the plurality of item receptacles that is to receive the first item;
based on at least one of a second sound input or a second visual input received by the HUD device, make a determination that the at least one target item receptacle received at least one instance of the first item;
based on the determination, present, via the display, a second visualization corresponding to a second item entry from the fulfillment route, wherein the second visualization comprises a visual indication of a second item location;
make an out-of-stock determination that an instance of a second item identified in the second item entry is lacking at the second item location; and
based on the out-of-stock determination, identify at least one alternative item location for the second item within the given environment.

2. The HUD device of claim 1, wherein the fulfillment route comprises a sequence order for the plurality of item entries that was defined in accordance with the locations within the given environment that correspond to the plurality of item entries.

3. The HUD device of claim 1, wherein the program instructions that are executable by the at least one processor such that the HUD device is configured to make the out-of-stock determination comprise program instructions that are executable by the at least one processor such that the HUD device is configured to:
receive, via an input interface of the HUD device, an input that is indicative of an out-of-stock occurrence; and
make the out-of-stock determination based on the input that is indicative of the out-of-stock occurrence.

4. The HUD device of claim 1, wherein the second visualization further comprises a visual indication of a second item identified in the second item entry, and further comprising program instructions stored on the non-transitory computer-readable medium that are executable by the at least one processor such that the HUD device is configured to:
based on the out-of-stock determination, identify an updated fulfillment route comprising an item entry that comprises the at least one alternative item location within the environment; and
in accordance with the updated fulfillment route, present, via the display, a visual indication of the at least one alternative item location for the second item.

5. The HUD device of claim 1, wherein the first item entry comprises a first item identifier, and wherein the program instructions that are executable by the at least one processor such that the HUD device is configured to make the verification that there is an instance of the first item identified in the first item entry comprise program instructions that are executable by the at least one processor such that the HUD device is configured to:
receive, by the HUD device, the first visual input;
execute an object-detection model corresponding to the first item identifier utilizing the first visual input received by the HUD device; and
make the verification that there is an instance of the first item identified in the first item entry based on the execution of the object detection model.

6. The HUD device of claim 5, wherein the object-detection model is a first object-detection model, and wherein the program instructions that are executable by the at least one processor such that the HUD device is configured to make the determination that the at least one target item receptacle received at least one instance of the first item comprise program instructions that are executable by the at least one processor such that the HUD device is configured to:
receive, by the HUD device, the second visual input;
execute the first object-detection model utilizing the second visual input to make a determination that an instance of the first item is within the second visual input;
execute a second object-detection model utilizing the second visual input to make a determination that the at least one target item receptacle is within the second visual input; and
based on the determination that an instance of the first item is within the second visual input and the determination that the at least one target item receptacle is within the second visual input, make the determination that the at least one target item receptacle received at least one instance of the first item.

7. A non-transitory computer-readable medium comprising program instructions stored on the non-transitory computer-readable medium that are executable by at least one processor such that a wearable computing device is configured to:
identify a fulfillment route that is associated with at least one customer order that is to be fulfilled and that comprises a plurality of item entries, wherein each respective item entry comprises (i) an item identifier and (ii) an item location corresponding to a location within a given environment;

present, via a display of the wearable computing device, a first visualization corresponding to a first item entry from the fulfillment route, wherein the first visualization comprises a visual indication of a first item location;

based on at least one of a first sound input or a first visual input received by the wearable computing device, make a verification that there is an instance of a first item identified in the first item entry;

based on the verification, present, via the display, (i) a placement visualization representing an array of a plurality of item receptacles in the given environment and (ii) at least one placement indication within the placement visualization identifying at least one target item receptacle of the plurality of item receptacles that is to receive the first item;

based on at least one of a second sound input or a second visual input received by the wearable computing device, make a determination that the at least one target item receptacle received at least one instance of the first item;

based on the determination, present, via the display, a second visualization corresponding to a second item entry from the fulfillment route, wherein the second visualization comprises a visual indication of a second item location;

make an out-of-stock determination that an instance of a second item identified in the second item entry is lacking at the second item location; and based on the out-of-stock determination, identify at least one alternative item location for the second item within the given environment.

8. The computer-readable medium of claim 7, wherein the fulfillment route comprises a sequence order for the plurality of item entries that was defined in accordance with the locations within the given environment that correspond to the plurality of item entries.

9. The computer-readable medium of claim 7, wherein the program instructions that are executable by the at least one processor such that the wearable computing device is configured to make the out-of-stock determination comprise program instructions that are executable by the at least one processor such that the wearable computing device is configured to:
receive, via an input interface of the wearable computing device, an input that is indicative of an out-of-stock occurrence; and
make the out-of-stock determination based on the input that is indicative of the out-of-stock occurrence.

10. The computer-readable medium of claim 7, wherein the second visualization further comprises a visual indication of a second item identified in the second item entry, and further comprising program instructions stored on the non-transitory computer-readable medium that are executable by the at least one processor such that the wearable computing device is configured to:
based on the out-of-stock determination, identify an updated fulfillment route comprising an item entry that comprises the at least one alternative item location within the environment; and
in accordance with the updated fulfillment route, present, via the display, a visual indication of the at least one alternative item location for the second item.

11. The computer-readable medium of claim 7, wherein the first item entry comprises a first item identifier, and wherein the program instructions that are executable by the at least one processor such that the wearable computing device is configured to make the verification that there is an instance of the first item identified in the first item entry comprise program instructions that are executable by the at least one processor such that the wearable computing device is configured to:
receive, by the wearable computing device, the first visual input;
execute an object-detection model corresponding to the first item identifier utilizing the first visual input received by the wearable computing device; and
make the verification that there is an instance of the first item identified in the first item entry based on the execution of the object detection model.

12. The computer-readable medium of claim 11, wherein the object-detection model is a first object-detection model, and wherein the program instructions that are executable by the at least one processor such that the wearable computing device is configured to make the determination that the at least one target item receptacle received at least one instance of the first item comprise program instructions that are executable by the at least one processor such that the wearable computing device is configured to:
receive, by the wearable computing device, the second visual input;
execute the first object-detection model utilizing the second visual input to make a determination that an instance of the first item is within the second visual input;
execute a second object-detection model utilizing the second visual input to make a determination that the at least one target item receptacle is within the second visual input; and
based on the determination that an instance of the first item is within the second visual input and the determination that the at least one target item receptacle is within the second visual input, make the determination that the at least one target item receptacle received at least one instance of the first item.

13. A computer-implemented method comprising:
identifying, by a heads-up display (HUD) device, a fulfillment route that is associated with at least one customer order that is to be fulfilled and that comprises a plurality of item entries, wherein each respective item entry comprises (i) an item identifier and (ii) an item location corresponding to a location within a given environment;
presenting, via a display of the HUD device, a first visualization corresponding to a first item entry from the fulfillment route, wherein the first visualization comprises a visual indication of a first item location;
based on at least one of a first sound input or a first visual input received by the HUD device, making a verification that there is an instance of a first item identified in the first item entry;
based on the verification, presenting, via the display, (i) a placement visualization representing an array of a plurality of item receptacles in the given environment and (ii) at least one placement indication within the placement visualization identifying at least one target item receptacle of the plurality of item receptacles that is to receive the first item;
based on at least one of a second sound input or a second visual input received by the HUD device, making a determination that the at least one target item receptacle received at least one instance of the first item;
based on the determination, presenting, via the display, a second visualization corresponding to a second item entry from the fulfillment route, wherein the second visualization comprises a visual indication of a second item location;

making an out-of-stock determination that an instance of a second item identified in the second item entry is lacking at the second item location; and based on the out-of-stock determination, identifying at least one alternative item location for the second item within the given environment.

14. The method of claim 13, wherein the fulfillment route comprises a sequence order for the plurality of item entries that was defined in accordance with the locations within the given environment that correspond to the plurality of item entries.

15. The method of claim 13, wherein making the out-of-stock determination comprises:

receiving, via an input interface of the HUD device, an input that is indicative of an out-of-stock occurrence; and making the out-of-stock determination based on the input that is indicative of the out-of-stock occurrence.

16. The method of claim 13, wherein the second visualization further comprises a visual indication of a second item identified in the second item entry, and wherein the method further comprises:

based on the out-of-stock determination, identifying an updated fulfillment route comprising an item entry that comprises the at least one alternative item location within the environment; and in accordance with the updated fulfillment route, presenting, via the display, a visual indication of the at least one alternative item location for the second item.

17. The method of claim 13, wherein the first item entry comprises a first item identifier, and wherein making the verification that there is an instance of the first item identified in the first item entry comprises:

receiving, by the HUD device, the first visual input;

executing an object-detection model corresponding to the first item identifier utilizing the first visual input received by the HUD device; and making the verification that there is an instance of the first item identified in the first item entry based on the execution of the object detection model.

* * * * *